United States Patent
Gibbon et al.

(10) Patent No.: US 11,841,913 B2
(45) Date of Patent: *Dec. 12, 2023

(54) SYSTEM AND METHOD FOR CONTROLLING VISIBILITY OF ELEMENTS OF DISPLAYED ELECTRONIC CONTENT

(71) Applicant: The Toronto-Dominion Bank, Toronto (CA)

(72) Inventors: Patrick Gibbon, Ancaster (CA); James Zachary Pryor, Toronto (CA); Jonathan K. Barnett, Oakville (CA); Roy D'Souza, Oakville (CA); William Stewart James Law, St. Catherines (CA); Christopher Arthur Holland McAlpine, Grimsby (CA); Ethan Christopher McAlpine, Grimsby (CA); Maria Verna, Vaughan (CA); Patrick Robert Goralski, London (CA); Cathleen Ruth Carrel, Minesing (CA); Rohan Anand, Toronto (CA); Christy Ann Dyba, Markham (CA); Dheeraj Jagtiani, Toronto (CA); Ali Hafezi, Toronto (CA); Ashkan Alavi-Harati, Markham (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/829,640

(22) Filed: Jun. 1, 2022

(65) Prior Publication Data
US 2022/0292151 A1    Sep. 15, 2022

Related U.S. Application Data

(63) Continuation of application No. 16/370,612, filed on Mar. 29, 2019, now Pat. No. 11,379,546, which is a
(Continued)

(51) Int. Cl.
G06F 16/9535 (2019.01)
G06Q 30/0601 (2023.01)
G06Q 50/16 (2012.01)

(52) U.S. Cl.
CPC ..... *G06F 16/9535* (2019.01); *G06Q 30/0625* (2013.01); *G06Q 50/16* (2013.01)

(58) Field of Classification Search
None
See application file for complete search history.

(56) References Cited

U.S. PATENT DOCUMENTS 6,393,412 B1   5/2002   Deep
6,496,851 B1  12/2002   Morris et al.
(Continued)

FOREIGN PATENT DOCUMENTS

WO   2018/061027 A1   4/2015

OTHER PUBLICATIONS

Jansen, Marc; Rossmanith, Philipp; Uzun, Ismail; Hoppe, Ulrich, Integrating heterogeneous personal devices with public display-based information services, 2005, Proceedings—IEEE International Workshop on Wireless and Mobile Technologies in Education, IEEE Computer Society, pp. 149-153 (Year: 2005).
(Continued)

*Primary Examiner* — Sarah M Monfeldt
*Assistant Examiner* — Michael J. Monaghan
(74) *Attorney, Agent, or Firm* — CPST Intellectual Property Inc.; Brett J. Slaney

(57) ABSTRACT

A system and method are provided for controlling visibility of elements of displayed electronic content. The method includes providing via a communications module a user interface viewable by a plurality of entity devices, and enabling via the communications module the user interface to display electronic content comprising at least one ele-
(Continued)

ment. The method also includes determining at least one filtering criterion for controlling visibility of the at least one element of the electronic content being displayed, and concealing or modifying at least one element of the electronic content as displayed in the user interface for at least one of the plurality of entity devices, according to the at least one filtering criterion.

20 Claims, 18 Drawing Sheets

Related U.S. Application Data continuation-in-part of application No. 16/275,227, filed on Feb. 13, 2019, now Pat. No. 11,430,077.

(56) References Cited

U.S. PATENT DOCUMENTS

| | | |
|---|---|---|
| 7,076,452 B2 | 7/2006 | Florance et al. |
| 7,502,831 B1 | 3/2009 | Macias et al. |
| 7,797,255 B1 | 9/2010 | Hastings |
| 7,818,219 B2 | 10/2010 | Klivington et al. |
| 8,140,442 B2 | 3/2012 | Heyer |
| 8,332,312 B2 | 12/2012 | Polston et al. |
| 8,433,650 B1 | 4/2013 | Thomas |
| 9,152,946 B2 | 10/2015 | Rankin, Jr. et al. |
| 9,412,136 B2 | 8/2016 | Gertzfield et al. |
| 9,489,657 B2 | 11/2016 | Chudge |
| 9,497,795 B1 | 11/2016 | Billman |
| 9,553,833 B2 | 1/2017 | Chandrasekaran |
| 9,998,881 B2 | 6/2018 | Hosier, Jr. |
| 10,002,398 B1 | 6/2018 | Isaacson |
| 10,380,380 B1* | 8/2019 | Abdi Taghi Abad ............ G06F 16/907 |
| 10,425,422 B1 | 9/2019 | Ledet |
| 2002/0049624 A1 | 4/2002 | Ravies, Jr. |
| 2003/0041113 A1 | 2/2003 | Larsen |
| 2004/0078596 A1* | 4/2004 | Kent, Jr. .......... H04L 69/08 713/160 |
| 2004/0098315 A1 | 5/2004 | Hanyes et al. |
| 2004/0162773 A1 | 8/2004 | Del Rey |
| 2006/0235712 A1 | 10/2006 | Rodriquez |
| 2008/0201257 A1 | 8/2008 | Lewis et al. |
| 2009/0235199 A1 | 9/2009 | Mastie |
| 2010/0223341 A1 | 9/2010 | Manolescu |
| 2011/0119576 A1 | 5/2011 | Aumann |
| 2013/0132360 A1 | 5/2013 | Kuznetsov |
| 2013/0138555 A1 | 5/2013 | Shishkov |
| 2014/0047556 A1 | 2/2014 | Davis |
| 2014/0223573 A1 | 8/2014 | Reedy |
| 2014/0279336 A1* | 9/2014 | Eid .................... G06Q 10/107 705/35 |
| 2014/0365387 A1 | 12/2014 | Kiaman et al. |
| 2015/0088670 A1 | 3/2015 | Clement |
| 2015/0161200 A1 | 6/2015 | Barba et al. |
| 2015/0288633 A1* | 10/2015 | Ogundokun ............ H04L 51/42 709/206 |
| 2016/0078411 A1 | 3/2016 | Dicarlo |
| 2016/0127322 A1 | 5/2016 | Ben-Natan |
| 2016/0283517 A1 | 9/2016 | Polston |
| 2016/0294746 A1 | 10/2016 | Boothroyd |
| 2016/0380927 A1* | 12/2016 | Vaughn .................... H04L 51/04 709/206 |
| 2017/0024836 A1 | 1/2017 | Jackson et al. |
| 2017/0032021 A1 | 2/2017 | Watanachote |
| 2017/0032470 A1 | 2/2017 | Watanachote |
| 2017/0171121 A1 | 6/2017 | Zhang et al. |
| 2017/0220813 A1 | 8/2017 | Mullins |
| 2017/0353423 A1 | 12/2017 | Morrison |
| 2017/0372046 A1 | 12/2017 | Thomee |
| 2018/0007169 A1 | 1/2018 | Smedberg |
| 2018/0241703 A1* | 8/2018 | Feuz .................... H04L 51/216 |
| 2018/0322597 A1 | 11/2018 | Sher |
| 2018/0330118 A1* | 11/2018 | Leung ................ G06F 21/6263 |
| 2018/0367495 A1 | 12/2018 | Kim et al. |
| 2018/0374131 A1 | 12/2018 | Currie |
| 2019/0005265 A1 | 1/2019 | Panchapakesan |
| 2019/0080425 A1 | 3/2019 | Bui |
| 2019/0266231 A1 | 8/2019 | Banerjee |
| 2019/0318433 A1 | 10/2019 | McGee |
| 2020/0134750 A1 | 4/2020 | Wolf |

OTHER PUBLICATIONS

Fredrikson, M.; Livshits, B., RePriv: Re-imagining Content Personalization and In-browser Privacy, 2011,2011 IEEE Symposium on Security and Privacy (SP), IEEE Computer Society, pp. 131-146. (Year: 2011).

K. W. Kongsgård, N. A. Nordbotten, F. Mancini and P. E. Engelstad, Data loss prevention for cross-domain instant messaging, 2017, 2017 IEEE Symposium Series on Computational Intelligence (SSCI), 2017, pp. 1-8, (Year: 2017).

Kirzhner, E.; Big Data Applications in Real Estate Analysis; Dec. 18, 2017; retrieved online from https://codeburst.io/big-data-applications-in-real-estate-analysis-502accc54dc8.

National Property Buyers; published at least as early as Oct. 30, 2018; retrieve online from https://www.nationalpropertybuyers.com. au/2482-2/.

Big Data and the future of Real Estate Industry; published at least as early as Oct. 30, 2018; retrieved online from https://www. scrapehero.com/big-data-and-the-future-of-the-real-estate-industry/.

Liu H. et al.; "Improved group off-the-record messaging"; WPES '13 Proceedings of the 12th ACM workshop on Workshop on privacy in the electronic society; pp. 249-254; Berlin, Germany; Nov. 4-4, 2013; ISBN: 378-1-4503-2485-4.

* cited by examiner

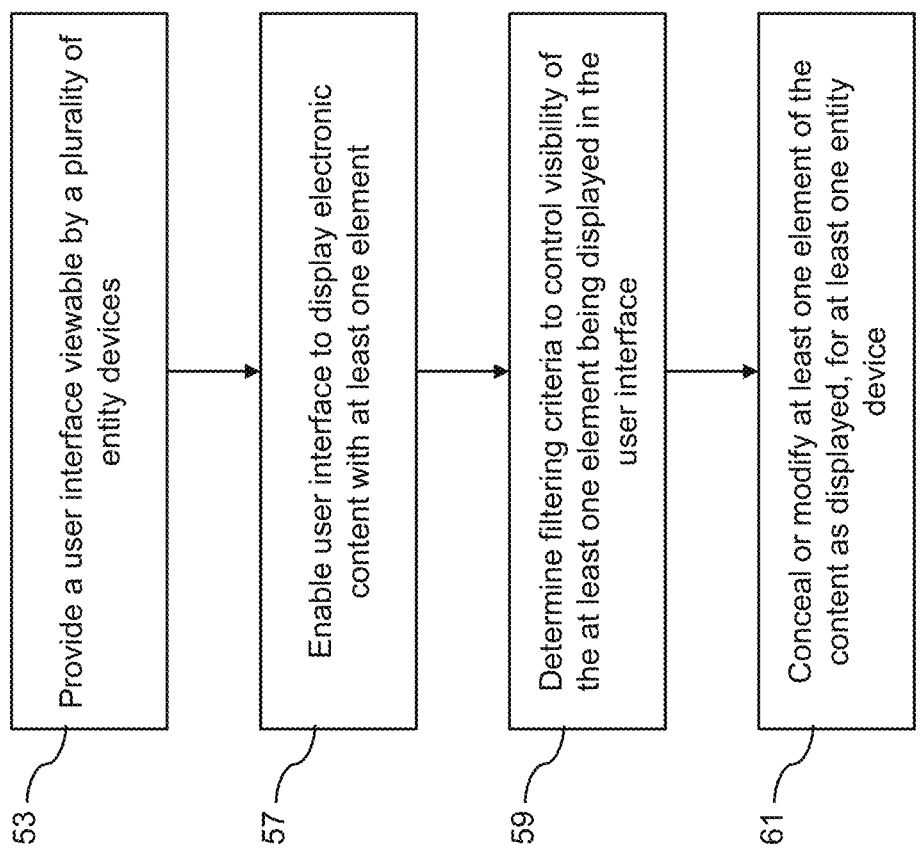

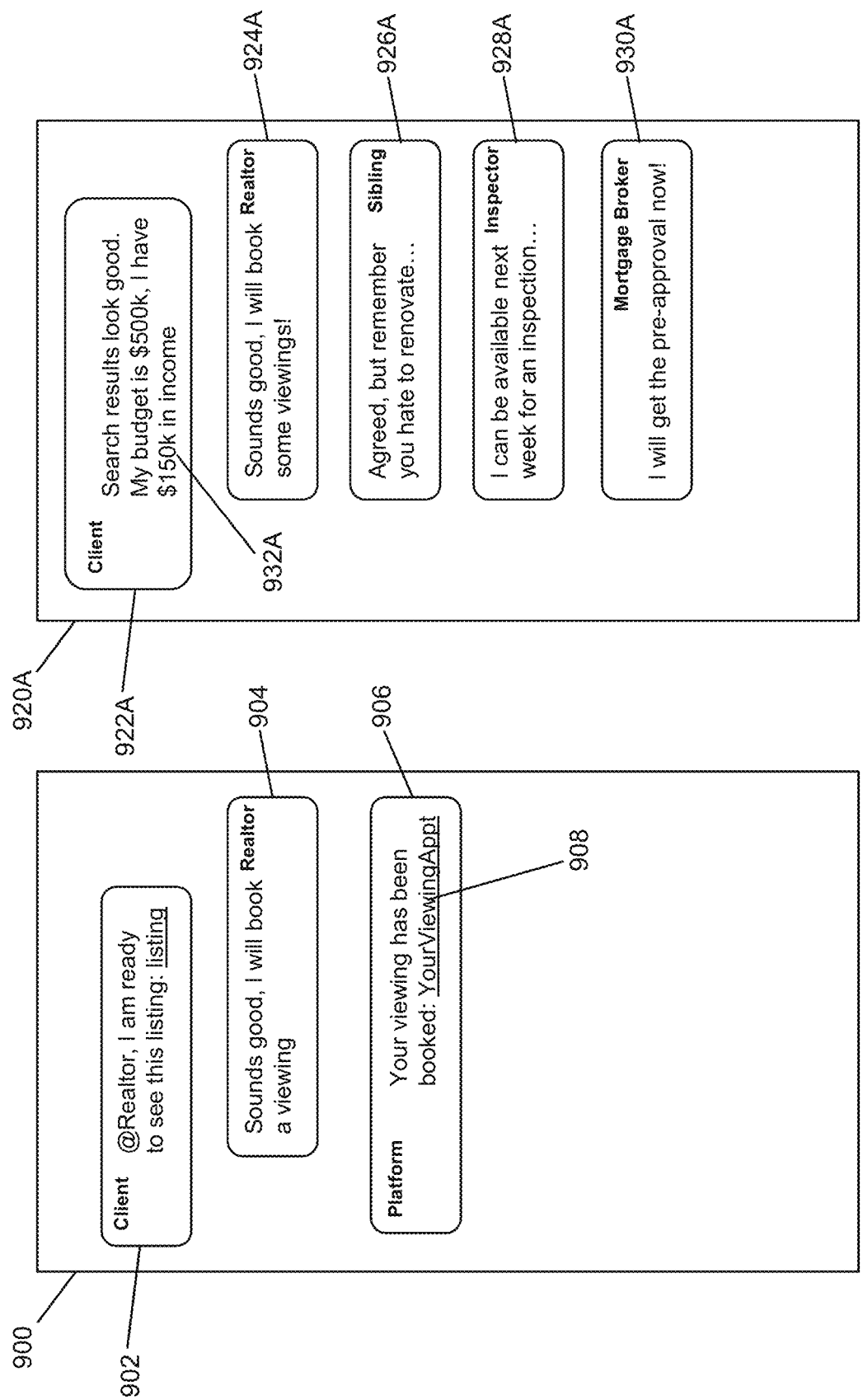

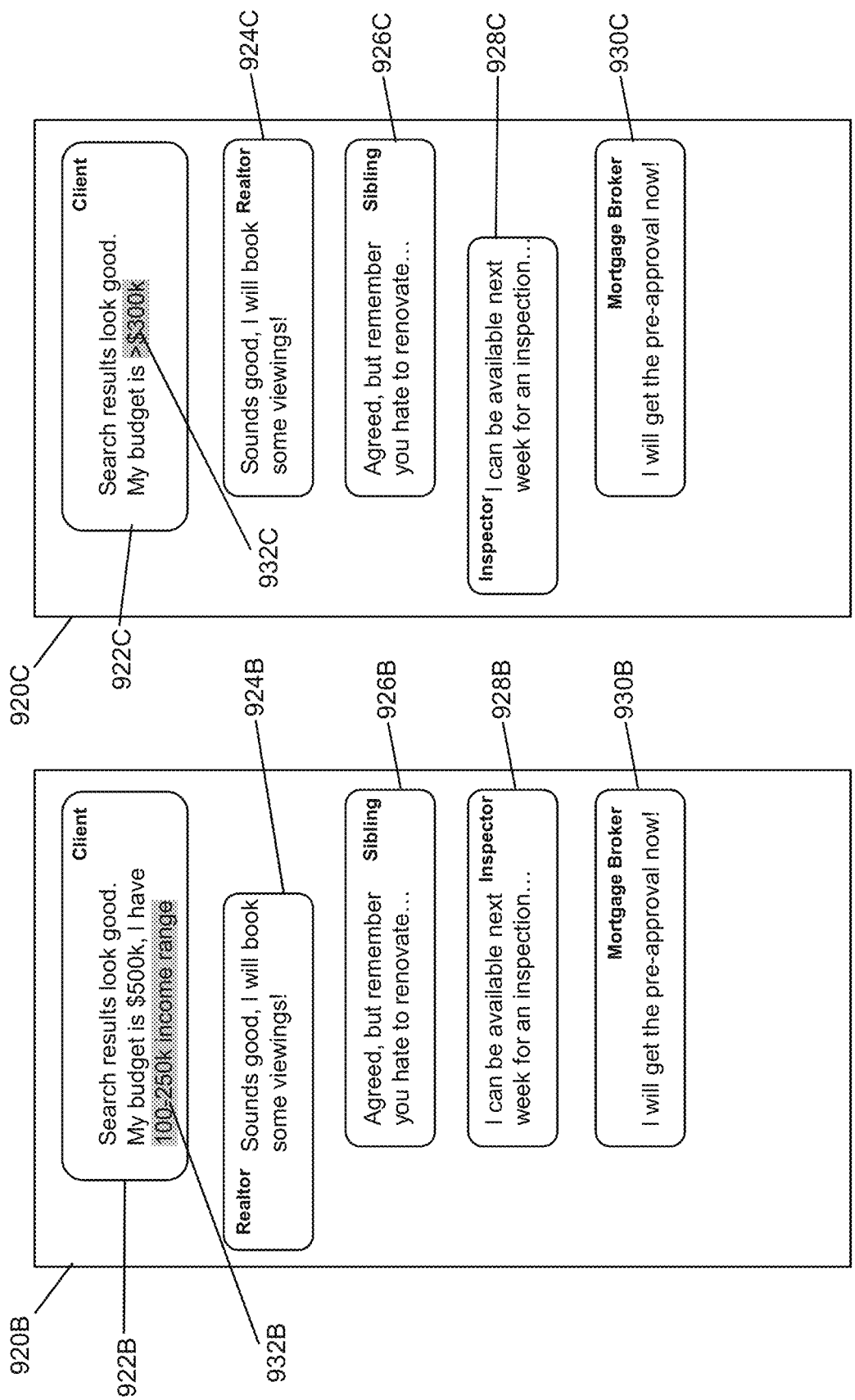

SYSTEM AND METHOD FOR CONTROLLING VISIBILITY OF ELEMENTS OF DISPLAYED ELECTRONIC CONTENT

CROSS-REFERENCE TO RELATED APPLICATION(S)

This application is a Continuation of U.S. patent application Ser. No. 16/370,612 filed on Mar. 29, 2019, which is a Continuation-In-Part (CIP) of U.S. patent application Ser. No. 16/275,227 filed on Feb. 13, 2019, the contents of which are incorporated herein by reference in their entirety.

TECHNICAL FIELD

The following relates generally to controlling visibility of elements of displayed electronic content.

BACKGROUND

With the availability of online searchable databases of assets available for acquisition, e.g., real estate listing sites; individuals who are looking to acquire such assets have options to search and monitor listings according to various criteria. For example, individuals who are looking to purchase or lease a home or other dwelling may search and monitor listings of properties in certain desired neighborhoods. For real estate assets, potential home buyers normally hire a realtor or real estate service that may have access to more real estate data and other information relevant to a home search, in addition to his/her experience. For example, such a realtor may actively search and review new listings to present to their clients according to their understanding of the needs of each individual client. Moreover, there are typically several other tasks that a home buyer should manage at some point before, during or after locating a desired home. For example, the home buyer may need to find suitable lending such as a mortgage and hire various third-party professionals (e.g., realtors, brokers, lawyers, inspectors, and contractors). These tasks can become overwhelming and are often actively managed by the home buyers themselves.

BRIEF DESCRIPTION OF THE DRAWINGS

Embodiments will now be described with reference to the appended drawings wherein:

FIG. 6 is a flow diagram of an example of computer executable instructions for concealing or modifying at least one element of displayed electronic content.

FIG. 16 is an example of a graphical user interface of a virtual chat session with an appointment notification in a chat message.

FIG. 17 is an example of a graphical user interface of a virtual chat session from a perspective of the acquiring entity.

FIG. 18 is an example of a graphical user interface of the virtual chat session of FIG. 17, from a perspective of a realtor.

FIG. 19 is an example of a graphical user interface of the virtual chat session of FIG. 17, from a perspective of an inspector.

DETAILED DESCRIPTION

Figure 1:
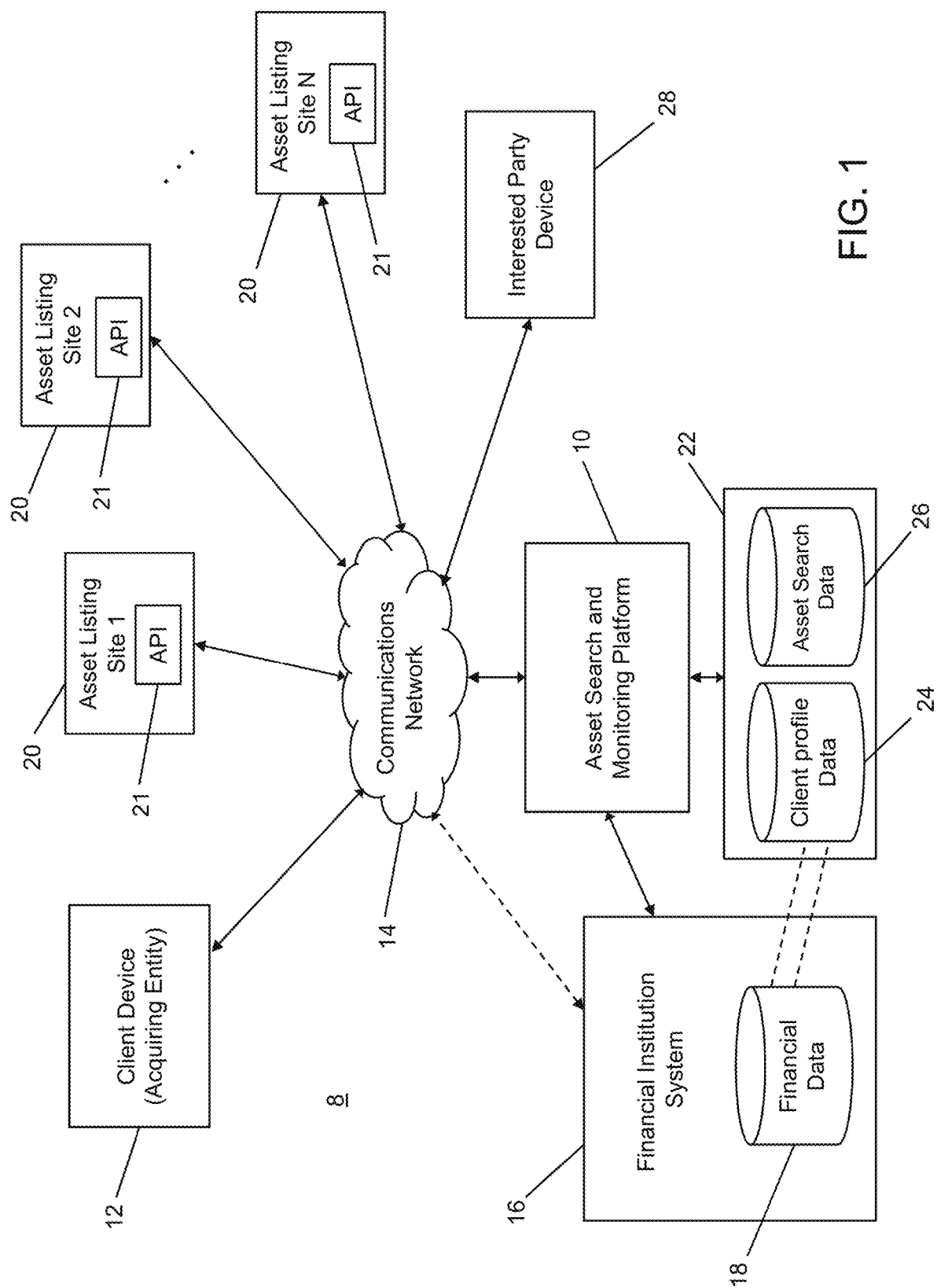
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Individuals who are looking to acquire such assets have options to search and monitor listings according to various criteria. Moreover, there are typically several other tasks that a home buyer should manage at some point before, during or after locating a desired home. There is a need for a platform or tool to assist entities looking to acquire assets (e.g., potential home buyers) during the searching and acquisition process. Such a platform may be used to automatically search for candidate listings based on profile data, financial data, search criteria, and information related to the listed assets. The platform may be used to notify acquiring entities such that the acquiring entities can be notified of additional searches, updates to listings, and be reminded of additional steps or milestones in the acquisition process.

Communicating amongst entity devices, via such a platform, device or tool or using other electronic communication media, may also create a need to control what information is shared with which entity device. For example, a potential homebuyer may desire to communicate with multiple parties in a group chat or other conversational-style user interface. However, when sharing certain financial data, that potential homebuyer may be required to conduct multiple individual conversations to avoid divulging the same level or specificity of the financial data to all entities. This need can also more generally arise in any multi-entity communication such as when exchanging messages or sharing other types of electronic media, such as documents and multi-media files. To address the need to communicate with multiple parties in an efficient manner while controlling the amount of content in the communication to be shared with certain other entities, a device or platform providing a communications tool may be configured to control the visibility of electronic content being displayed by concealing or modifying at least one element of the electronic content as displayed in a user interface for at least one of a plurality of entity devices, according to at least one filtering criterion.

Certain example systems and methods described herein enable concealing or modifying at least one element of electronic content as displayed in a user interface for at least one of a plurality of entity devices, according to at least one filtering criterion. In one aspect, there is provided a device for controlling visibility of elements of displayed electronic content. The device includes a processor, a communications module coupled to the processor, and a memory coupled to the processor. The memory stores computer executable instructions that when executed by the processor cause the processor to provide via the communications module a user interface viewable by a plurality of entity devices and enable via the communications module the user interface to display electronic content comprising at least one element. The memory also stores computer executable instructions that when executed by the processor cause the processor to determine at least one filtering criterion for controlling visibility of the at least one element of the electronic content being displayed; and conceal or modify at least one element of the electronic content as displayed in the user interface for at least one of the plurality of entity devices, according to the at least one filtering criterion.

In another aspect, there is provided a method of controlling visibility of elements of displayed electronic content. The method is executed by a device having a processor and includes providing a user interface viewable by a plurality of entity devices, enabling module the user interface to display electronic content comprising at least one element, determining at least one filtering criterion for controlling visibility of the at least one element of the electronic content being displayed, and concealing or modifying at least one element of the electronic content as displayed in the user interface for at least one of the plurality of entity devices, according to the at least one filtering criterion.

In another aspect, there is provided non-transitory computer readable medium for controlling visibility of elements of displayed electronic content. The computer readable medium includes computer executable instructions for providing via a communications module a user interface viewable by a plurality of entity devices, enabling via the communications module the user interface to display electronic content comprising at least one element, determining at least one filtering criterion for controlling visibility of the at least one element of the electronic content being displayed, and concealing or modifying at least one element of the electronic content as displayed in the user interface for at least one of the plurality of entity devices, according to the at least one filtering criterion.

In certain example embodiments, the electronic content is created via the user interface by a first entity device of the plurality of entity devices. This may include receiving a first signal comprising an input from the first entity device selecting the at least one element of the electronic content to be concealed or modified and determining the at least one filtering criterion according to the input.

In certain example embodiments, the at least one filtering criterion may be determined automatically by the device. The at least one filtering criterion may be determined by the device according to which of the at least one of the plurality of entity devices can view the electronic content in the user interface. The at least one filtering criterion may include different filtering criteria for each of at least two of the plurality of entity devices.

In certain example embodiments, the at least one element of the electronic content that is concealed or modified may include sensitive data associated with one of the plurality of entity devices. The sensitive data may include financial data.

In certain example embodiments, the electronic content comprises a plurality of messages, and the at least one element being concealed or modified may correspond to at least a portion of a message of the plurality of messages.

In certain example embodiments, the electronic content may include an electronic document shared by a first entity device of the plurality of entity devices with at least one second entity device of the plurality of entity devices, with the at least one element concealed or modified corresponding to at least a portion of data in the electronic document.

In certain example embodiments, the electronic content may include multi-media content shared by a first entity device of the plurality of entity devices with at least one second entity device of the plurality of entity devices, with the at least one element concealed or modified corresponding to at least a portion of the multi-media content.

In certain example embodiments, the concealing or modifying may be applied during an active session comprising the user interface.

In certain example embodiments, the concealing or modifying may be applied during an offline interaction with the user interface.

In certain example embodiments, the electronic content may include a plurality of owners, each owner corresponding to one of a plurality of first entity devices having a corresponding set of filtering criteria for a respective owned version of the electronic content. This may include determining the corresponding set of filtering criteria according to which of the plurality of first entity devices displays the at least one element of the electronic content, and concealing or modifying the at least one element of the electronic content as displayed in the user interface for at least one of the plurality of entity devices, according to the corresponding set of filtering criteria.

FIG. 1 illustrates an exemplary computing environment 8. In one aspect, the computing environment 8 may include an asset search and monitoring platform 10 (referred to as "the platform 10" hereinafter), one or more client devices 12, and a communications network 14 connecting one or more components of the computing environment 8. The computing environment 8 may also include one or more asset listing sites 20. In the example shown in FIG. 1, N asset listing sites 20 are shown and each asset listing site 20 may be associated with one or more asset searching services (e.g., one or more real estate listing services). Each asset listing site 20 may include an application programming interface (API) 21 for interfacing with the platform 10 via the network 14.

The computing environment 8 may also include on or more interested party devices 28. It will be appreciated that the interested party devices 28 may be considered similar or the same as the client devices 12 but in this example embodiment are associated with other parties that are not necessarily an acquiring entity and support or otherwise participate in an asset purchasing process of a certain acquiring entity using a client device 12 in the computing environment. It will be appreciated that an interested party may also be an acquiring entity in other circumstances. Similarly, an acquiring entity may also be an interested third party for another acquiring entity.

The computing environment 8 may also include a financial institution system 16 (e.g., commercial bank) that provides financial services accounts to users and processes financial transactions associated with those financial service accounts. While several details of the financial institution system 16 have been omitted for clarity of illustration, shown in FIG. 1 is a financial datastore (also referred to as a database, memory or memory element) that stores financial data 18. The financial data 18 may be associated with users of the client devices 12 (who may also be interested parties in some example embodiments). The financial data 18 may include any data related to or derived from financial values or metrics associated with customers of the financial institution 16, for example, account balances, transaction histories, line of credit available, credit scores, mortgage balances, affordability metrics, investment account balances, investment values and types, among many others. The financial data 18 may also be associated with users of the interested party devices 28.

The computing environment 8 itself may also include a datastore 22. In the example shown in FIG. 1, the datastore 22 may be used to store client profile data 24 and asset search data 26. The client profile data 24 may be used to store data accumulated by or provided to the platform 10 and which is associated with a user of a client device 12. The client profile data 24 may be mapped to corresponding financial data 18 for that user (as illustrated using dashed lines in FIG. 1) and/or may include some of the financial data 18. The client profile data 24 can include both data that is associated with a client as well as data that is associated with one or more user accounts for that client as recognized by the platform 10. The data associated with a client may include, without limitation, demographic data (e.g., age, gender, income, location, etc.), preference data input by the client (e.g., hobbies, likes, dislikes, etc.), and inferred data generated through machine learning, modeling, pattern matching, or other automated techniques. The client profile data 24 may also include historical interactions and transactions associated with the platform 10, e.g., login history, search history, communication logs, document sharing metrics, etc. The client profile data 24 may also include documents, media content or other files that are being shared on the platform 10 or otherwise stored for the client.

The asset search data 26 includes search criteria, search results, and other information related to one or more of the asset listing search sites 20 and may be organized per client device 12. That is, for each acquiring entity associated with a client device 12, a set of asset search data 26 may be stored to track searches conducted by the acquiring entity, results from those searches, search criteria used by the platform 10 to automatically search on behalf of the acquiring entity, and any other information or credentials for utilizing the asset listing sites 20. For example, the platform 10 may be given permission by the acquiring entity to store user login credentials for user accounts associated with one or more of the asset listing sites 20 to provide further personalization of the searching and monitoring operations performed by the platform 10. The API 21 may be used by the platform 10 to establish connectivity and permit such personalized access to the asset listing sites 20. The asset search data 26 may be updated and refined over time by monitoring searching activities conducted by the client devices 12 on the asset listing sites 20 or by tracking searching and monitoring activities performed by the platform 10 on behalf of the acquiring entities.

It can be appreciated that the datastore 22 is shown separately from the platform 10 for illustrative purposes only and may also be at least partially stored within a database, memory, or portion thereof within the platform 10. It can also be appreciated that while the platform 10 and financial institution system 16 are shown as separate entities in FIG. 1, they may also be part of the same system. For example, the platform 10 can be hosted and provided within the financial institution system 16.

Client devices 12 may be associated with one or more users. Users may be referred to herein as acquiring entities, homebuyers, or other entities associated with an exchange activity such as a home buying process. The computing environment 8 may include multiple client devices 12, each client device 12 being associated with a separate user or with one or more users. In certain embodiments, a user may operate client device 12 such that client device 12 performs one or more processes consistent with the disclosed embodiments. For example, the user may use client device 12 to engage and interface with the platform 10 and asset listing sites 20 to assist in purchasing a home. The client device 12 may also engage and interface with users of the interested party devices 28, e.g., friends, family, co-workers, advisors such as realtors or mortgage brokers, etc. Similarly, the client device 12 may engage and interface with the financial institution system 16 for activities both related and unrelated to searching and acquiring assets available for acquisition. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12 and different types of asset listing sites 20 and interested party devices 28. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, platform 10 may be one or more computer systems configured to process and store information and execute software instructions to perform one or more processes consistent with the disclosed embodiments. In certain embodiments, although not required, platform 10 may be associated with one or more business entities. In certain embodiments, platform 10 may represent or be part of any type of business entity. For example, platform 10 may be a system associated with a commercial bank (e.g., financial institution system 16), a retailer, or some other type of business.

Referring back to FIG. 1, the platform 10 and/or financial institution system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the platform 10 and financial institution system 16. The cryptographic server may be used to protect the financial data 18, client profile data 24, and asset search data 26 by way of encryption for data protection, digital signatures or message digests for data integrity, and by using digital certificates to authenticate the identity of the users and client devices 12, interested party devices 28, and asset listing sites 20 with which the platform 10 communicates to inhibit data breaches by adversaries. It can be appreciated that various cryptographic mechanisms and protocols can be chosen and implemented to suit the constraints and requirements of the particular deployment of the platform 10 as is known in the art.

Figure 2:
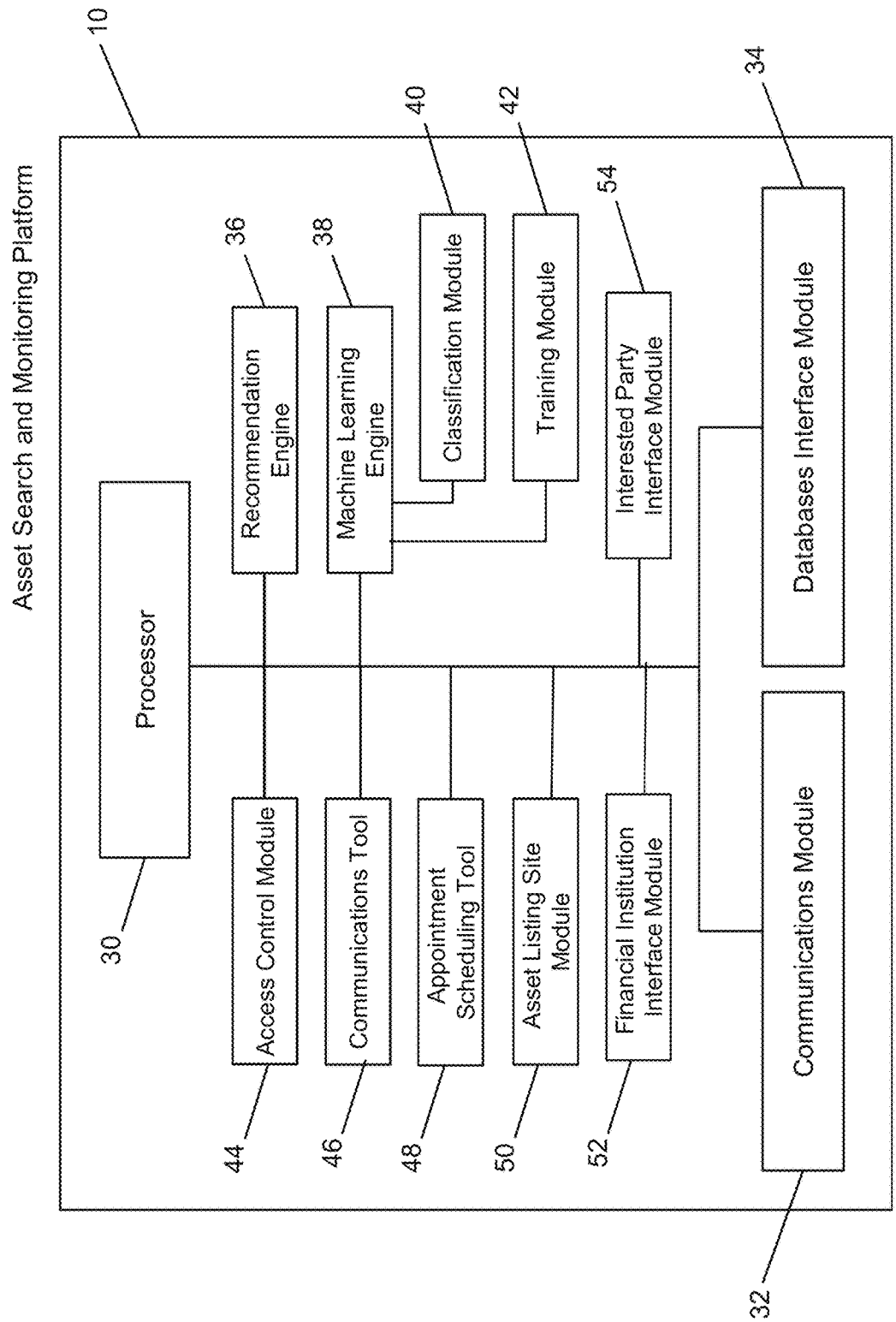
FIG. 2 is a block diagram of an example configuration of an asset search and monitoring platform.

In FIG. 2, an example configuration of the platform 10 is shown. In certain embodiments, the platform 10 may include one or more processors 30, a communications module 32, and a database interface module 34 for interfacing with the datastore 22 to retrieve and store data. Communications module 32 enables the platform 10 to communicate with one or more other components of the computing environment 8, such as client device 12, interested party devices 28, financial institution system 16 or asset search sites 20 (or one of its components), via a bus or other communication network, such as the communication network 14. While not delineated in FIG. 2, the platform 10 includes at least one memory or memory device, that can include a tangible and non-transitory computer-readable medium having stored therein computer programs, sets of instructions, code, or data to be executed by processor 30. FIG. 2 illustrates examples of modules, tools and engines stored in memory on the platform 10 and operated by the processor 30. It can be appreciated that any of the modules, tools, and engines shown in FIG. 2 may also be hosted externally and be available to the platform 10, e.g., via the communications module 32. In the example embodiment shown in FIG. 2, the platform 10 includes a recommendation engine 36, a machine learning engine 38, a classification module 40, a training module 42, an access control module 44, a communications tool 46, an appointment scheduling tool 48, an asset listing site module 50, a financial institution interface module 52, and an interested party interface module 54.

The recommendation engine 36 is used by the platform 10 to generate one or more search recommendations for a client device 12. The recommendation engine 36 can access the client profile data 24 and asset search data 26 via the databases interface module 34 and apply one or more matching processes to generate the recommendation(s). The recommendation engine 36 may also have access to financial data 18 associated with the acquiring entity, which may be provided via the financial institution interface module 52. The recommendation engine 36 may utilize or otherwise interface with the machine learning engine 38 to both classify data currently being analyzed to generate a recommendation, and to train classifiers using data that is continually being processed and accumulated by the platform 10.

The machine learning engine 38 may also perform operations that classify the client profile data 24 and asset search data 26 in accordance with corresponding classifications parameters, e.g., based on an application of one or more machine learning algorithms to each of the groups of profile data 24, 26 (also referred to herein as "profile content"). The machine learning algorithms may include, but are not limited to, a one-dimensional, convolutional neural network model (e.g., implemented using a corresponding neural network library, such as Keras®), and the one or more machine learning algorithms may be trained against, and adaptively improved using, elements of previously classified profile content identifying suitable search criteria and/or suitable matches between users and assets such as homes listed by the asset listing services 20. Subsequent to classifying the profile content, the recommendation engine 36 may further process each element of the profile content to identify, and extract, a value characterizing the corresponding one of the classification parameters, e.g., based on an application of one or more additional machine learning algorithms to each of the elements of the profile content. By way of the example, the additional machine learning algorithms may include, but are not limited to, an adaptive natural language processing algorithm that, among other things, predicts starting and ending indices of a candidate parameter value within each element of profile content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified profile content. Classification parameters may be stored and maintained using the classification module 40, and training data may be stored and maintained using the training module 42.

In some instances, classification data stored in the classification module 40 may identify one or more parameters, e.g., "classification" parameters, that facilitate a classification of corresponding elements or groups of recognized profile content based on any of the exemplary machine learning algorithms or processes described herein. The one or more classification parameters may correspond to parameters that can indicate a suitability or compatibility between users and potential assets available for acquisition. For example, a target geographical area preference for a user's homebuying search can be correlated or deemed compatible or not with certain geographical areas associated with search results.

In some instances, the additional, or alternate, machine learning algorithms may include one or more adaptive, natural-language processing algorithms capable of parsing each of the classified portions of the profile content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of profile content (e.g., an address used in a real estate listing search) and a single classification parameter (e.g., a region of interest) and additionally, or alternatively, multiple classification parameters (e.g., a property tax level and a region of interest).

Based on the output of the one or more machine learning algorithms or processes, such as the one-dimensional, convolutional neural network model described herein, machine learning engine 38 may perform operations that classify each of the discrete elements of profile content as a corresponding one of the classification parameters, e.g., as obtained from classification data stored by the classification module 40.

The outputs of the machine learning algorithms or processes may then be used by the recommendation engine 36 to find one or more search criteria for monitoring, searching, and recommending available assets for the acquiring entity to acquire. The outputs of the machine learning algorithms may also include recommended ones of the listings from a given set of search results. As discussed in greater detail below, the searching and monitoring processes implemented by the recommendation engine 36 may operate based on search activities of the acquiring entity, or automatically on behalf of the acquiring entity, or both. For example, the recommendation engine 36 may learn search criteria and preferences from search activities conducted by the acquiring entity and then subsequently refine those search criteria based on data stored by the platform 10 and conduct additional searches using the same or different asset listing sites 20. For example, the platform 10 may use search criteria used by an acquiring entity searching on a first asset listing site 20 to generate a suitable set of search criteria to be used by the platform 10 on one or more second asset listing sites 20.

Referring again to FIG. 2, the access control module 44 may be used to apply a hierarchy of permission levels or otherwise apply predetermined criteria to determine what profile data can be shared with which entity in the computing environment 8. For example, the platform 10 may have been granted access to certain sensitive financial data 18 for a user, which is associated with a certain client device 12 in the computing environment 8. When communicating with the interested party devices 28 or asset listing sites 20, such access control measures can be applied to restrict the sharing of information with such entities.

Similarly, the client profile data 24 may include potentially sensitive information such as age, date of birth, or nationality, which the acquiring entity may not wish to have shared. For example, a realtor (as an example of an interested party in this example) may not require financial data 18 until forms are required for a bid or mortgage pre-approval, whereas some general personal information may be required to engage in a realtor representation agreement. As such, the access control module 44 can be used to control the sharing of certain client profile data 24 (and/or financial data 18) based on events in the searching and acquisition process. That is, different relationships between the acquiring entity and other entities in the computing environment 8 may require different levels of access to data stored by the platform 10 and the access control module 44 may be configured to control how much information is shared and with whom.

It will be appreciated that events representing or causing changes in these relationships can trigger different levels of access control to the client profile data 24 and/or financial data 18. This can include providing additional integration between the acquiring entity and the interested parties, in response to events indicative of a deeper or more formalized relationship (e.g., with advisor entities configured to communicate via the platform 10).

The platform 10 may also include a communications tool 46 that is provided to enable entities in the computing environment 8 to communicate with each other, e.g., via an instant messaging or chat interface, to share documents, or share other types of multi-media files, e.g., video or audio files. The platform 10 may also include an appointment scheduling tool 48 to enable the platform 10 to generate appointments and reminders related to certain events related to the asset acquisition process. It will be appreciated that the appointment scheduling tool 48 may be configured to interface with existing calendar applications and existing scheduling tools to create new appointments and reminders that work within existing infrastructure. For example, the platform 10 can be used to create a home viewing appointment, or a reminder to seek a pre-approval for a mortgage based on search activities and actions related to the home buying process. The communications tool 46 and the appointment scheduling tool 48 may include their own access control functionality or may utilize and coordinate with the access control module 44 for such functionality.

It can be appreciated that the delineation between the access control module 44, communications tool 46, and appointment scheduling tool 48 as shown in FIG. 2 is for illustrative purposes. The platform 10 may also include an asset listing site module 50 that may interface with the asset listing sites 20 via the API 21 to connect acquiring entities to the asset listing sites 20 and to monitor and track searching activities and search results obtained through those sites 20, which can initiate the recommendation engine 36 to determine additional search criteria, conduct additional searches, and provide recommended listings in notifications to the acquiring entity.

The platform 10 may also include a financial institution interface module 52 to provide a graphical user interface (GUI) or application programming interface (API) connectivity to communicate with the financial institution system 16 to obtain financial data 18 for a certain user. The platform 10 may also include an interested party interface module 54 to control access to the platform 10 for interested parties that are associated with a particular client device 12. For example, the interested party interface module 54 may maintain a list of approved interested parties that may access chat sessions and communicate with the acquiring entity via the platform 10. It can be appreciated that the asset listing site module 50, financial institution module 52 and interested party interface module 54 may also provide a web browser-based interface, an application or "app" interface, a machine language interface, etc.

Figure 3:
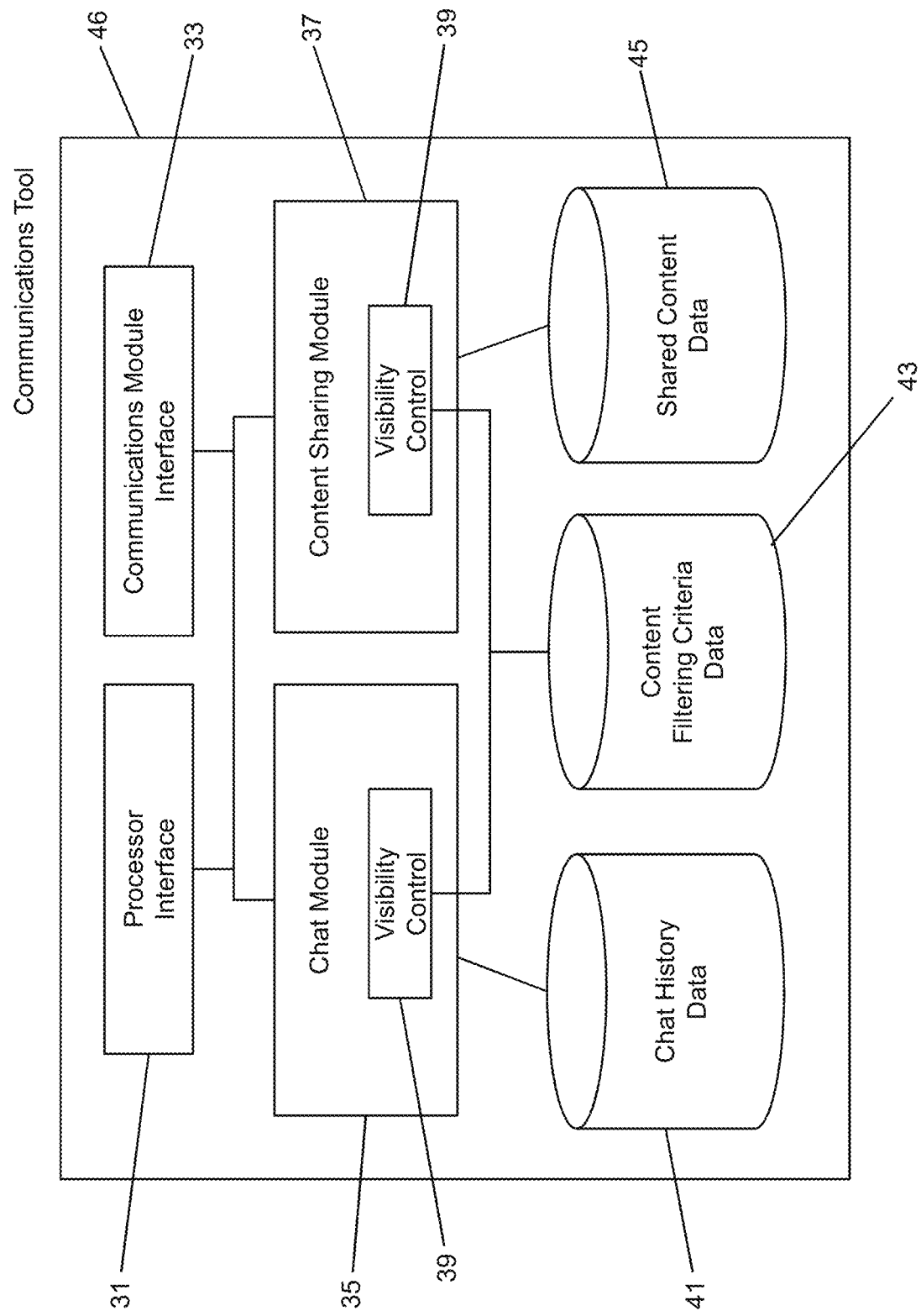
FIG. 3 is a block diagram of an example configuration of a communications tool.

In FIG. 3, an example configuration of the communications tool 46 is shown. In certain embodiments, the communications tool 46 may include a processor interface 31 to enable the communications tool 46 to utilize or interact with the at least one processor 30 of the platform 10. R can be appreciated that the communications tool 46 may also use the processor interface 31 in order to interface with other devices in operation thereof and the interface with the platform 10 is only one specific example. That is, the communications tool 46 can be used separately from the platform 10 in other applications and/or in other environments. The communications tool 46 may also include a communications module interface 33 to enable the communications tool 46 to utilize or interact with the communications module 32 of the platform 10. Like with the processor interface 31, it can be appreciated that the communications tool 46 may also use the communications module interface 33 in order to interface with other devices in other applications and/or in other environments.

In the example configuration shown in FIG. 3, the communications tool 46 may include both a chat module 35 and a content sharing module 37. The chat module 35 and the content sharing module 37 each include or otherwise have access to a visibility control 39 that enables the communications tool 46, when used for either chat-type communications or content sharing-type communications, to control the visibility of the content being shared or communicated, e.g., by concealing or modifying at least one element of the electronic content as displayed in a user interface for at least one of a plurality of entity devices. It can be appreciated that separate chat and content sharing modules 35, 37 are shown for ease of illustration and the capabilities and functionalities of each may also be provided by a single module having or having access to such a visibility control 39.

Figure 4:
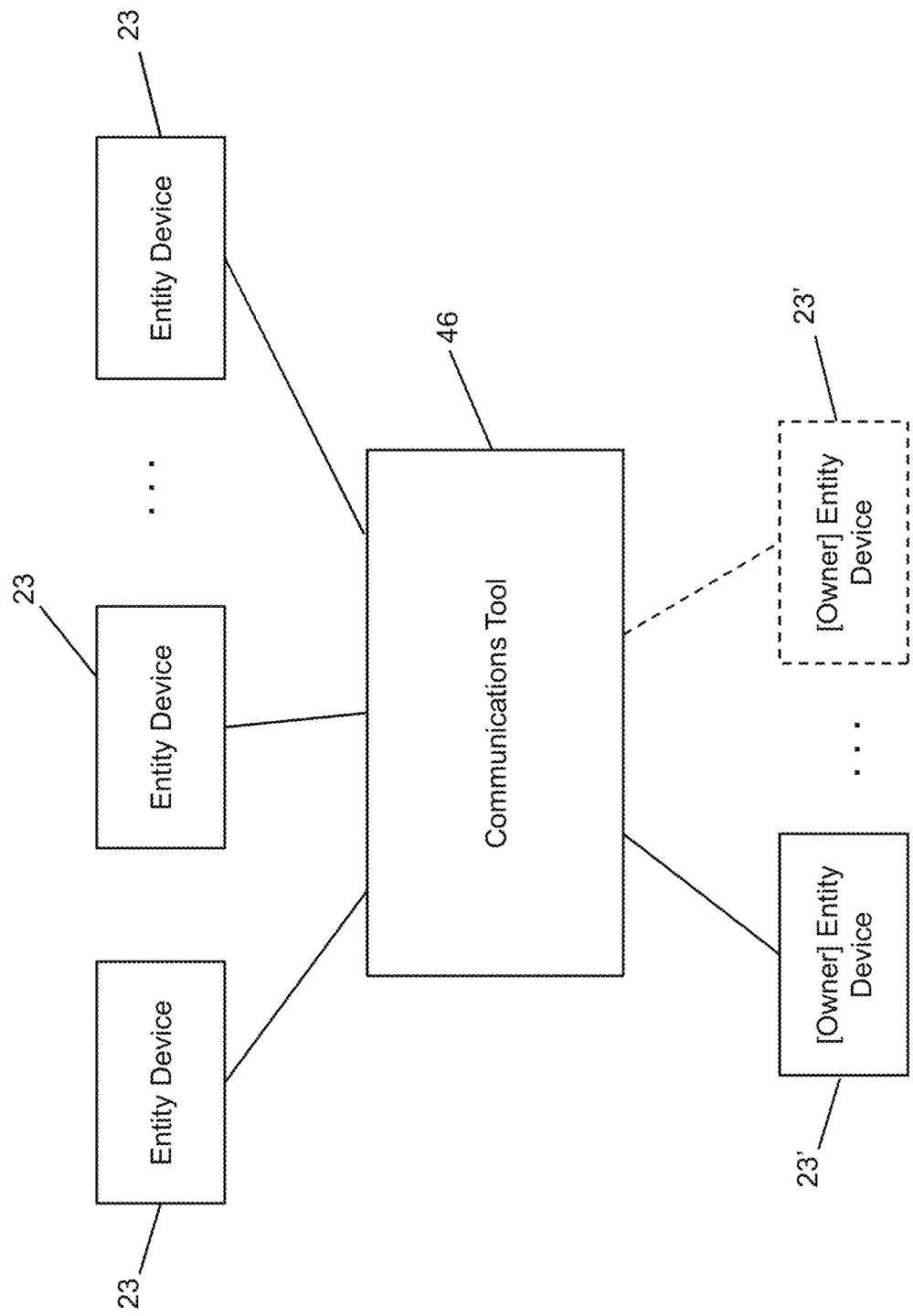
FIG. 4 is a schematic diagram of an example communications environment using the communications tool of FIG. 3.

The chat module 35 in this example embodiment provides a chat-type user interface, also sometimes referred to as a conversational- or instant messaging-type user interface, wherein entity devices 23 coupled to or in communication with the communications tool 46 (via the platform 10 or another device (e.g., as shown in FIG. 4)), may exchange messages in a conversational style. The chat module 35 includes or has access to chat history data 41, which in this example embodiment is stored by the communications tool 46. The chat history data 41 can be stored in various ways, e.g., by maintaining an original or complete "source of truth" with multiple versions that correspond to modified versions of the source of truth according to the corresponding content filtering criteria. Such modified versions can be stored in the chat history data 41 or can be generated as needed.

The visibility control 39 for the chat module 35 also includes or in this example embodiment has access to content filtering criteria data 43, which is stored by the communications tool 46. The content filtering criteria data 43 may include one or more sets of rules, masks, filters, or other logic that specifies which entity device can see what type or amount of content being shared amongst entity devices 23 via the communications tool 46. The content filtering criteria data 43 may apply such rules, masks, filters, or other logic to conceal or modify individual elements of the electronic content being shared and displayed with a user interface provided by the chat module 35, content sharing module 37 or communications tool 46 more generally. The content filtering criteria data 43 can be content-specific or entity-specific such that different sets of rules, masks, filters or other logic may be applied in different circumstances depending on the nature of the content being shared and displayed, and/or the entity devices 23 to which the communications tool 46 is providing the content for display.

The content filtering criteria data 43 may also associate an owner or multiple owners to particular electronic content and apply different sets of filtering criteria to the electronic content to account for permissions or rules associated with the entity devices 23 relative to each owner. For example, a legal agreement may have one owner identified for each party to the agreement and the electronic content including (or related to) the legal agreement when displayed in a user interface may apply multiple sets of filtering criteria for third parties, in effect modifying or concealing the electronic content in multiple ways to satisfy a union of the criteria. The content filtering criteria data 43 may be accessed and applied automatically by the communications tool 46 or may be determined and applied in real-time according to input(s) from the owner or entity device 23 responsible for controlling the visibility of the particular electronic content. For example, the filtering criteria being applied may specify types of data to be automatically concealed or modified in a predetermined manner, such as financial data. In another example, the user may be presented with a preview of the content that will be shared (e.g., message to be sent or document to be uploaded) with an option to select at least one "element" of the content (e.g., a word, value, phrase) and have that element modified or concealed. The content may then be displayed for one or more additional entity devices 23 according to the input(s).

It can be appreciated that the above-noted input(s) can apply predetermined criteria according to a hierarchy of permission levels (e.g., red, yellow, green), or can allow customizable criteria entered at the previewing stage. For example, after the user selects a particular element of the electronic content, the communications tool 46 may display a menu of options, such as: "conceal", "permission level 1", "permission level 2" (and so on), "custom modification", "user type", "user identity", etc. For permission levels, user types, and user identities, a predetermined modification may be associated with the particular level, type or identity. For example, user types may include colleagues, family, friends, or advisors. User identities may include a user's name which has associated modification(s). Custom modifications may be used to allow the user in control of the filtering to edit the element of content directly in a desired manner. For example, an income value may be modified to provide an income range or relative value such as "high" or "low".

Referring again to FIG. 3, the content sharing module 37 in this example embodiment provides a content sharing-type user interface such as a document sharing user interface, a social media user interface, a message board, a website, or a file transfer site, to name a few. While the content sharing module 37 is shown as being distinct from the chat module 35 in FIG. 3, it can be appreciated that these modules 35, 37 may be functions within an application associated with the communications tool 46. As such, the content sharing module 37 may be used to share static documents, but may also be used to share dynamically-changing content that may or may not include conversational-style content. That is, the chat module 35 may be associated with one type of content being shared and may have its own module as illustrated in FIG. 3 or be provided as an option within the content sharing module 37 or another module (not shown) within the communications tool 46. In this example embodiment, the content sharing module 37 includes or otherwise has access to shared content data 45, such as files or documents that are to be shared with and displayed by entity devices 23. The shared content data 45 can be stored in various ways, e.g., by maintaining an original or complete "source of truth" with multiple versions that correspond to modified versions of the source of truth according to the corresponding content filtering criteria. Such modified versions can be stored in the shared content data 45 or can be generated as needed.

In FIG. 4, it may be seen that any number of entity devices 23 may be in communication with each other via the communications tool 46. One or more entity devices 23 may in some circumstances be considered owner entity devices 23' wherein multiple owner entity devices 23' can be associated with the same electronic content. It can be appreciated that any entity device 23 may also be an owner entity device 23' and vice versa depending on such circumstances.

Figures 5A, 5B, 5C:
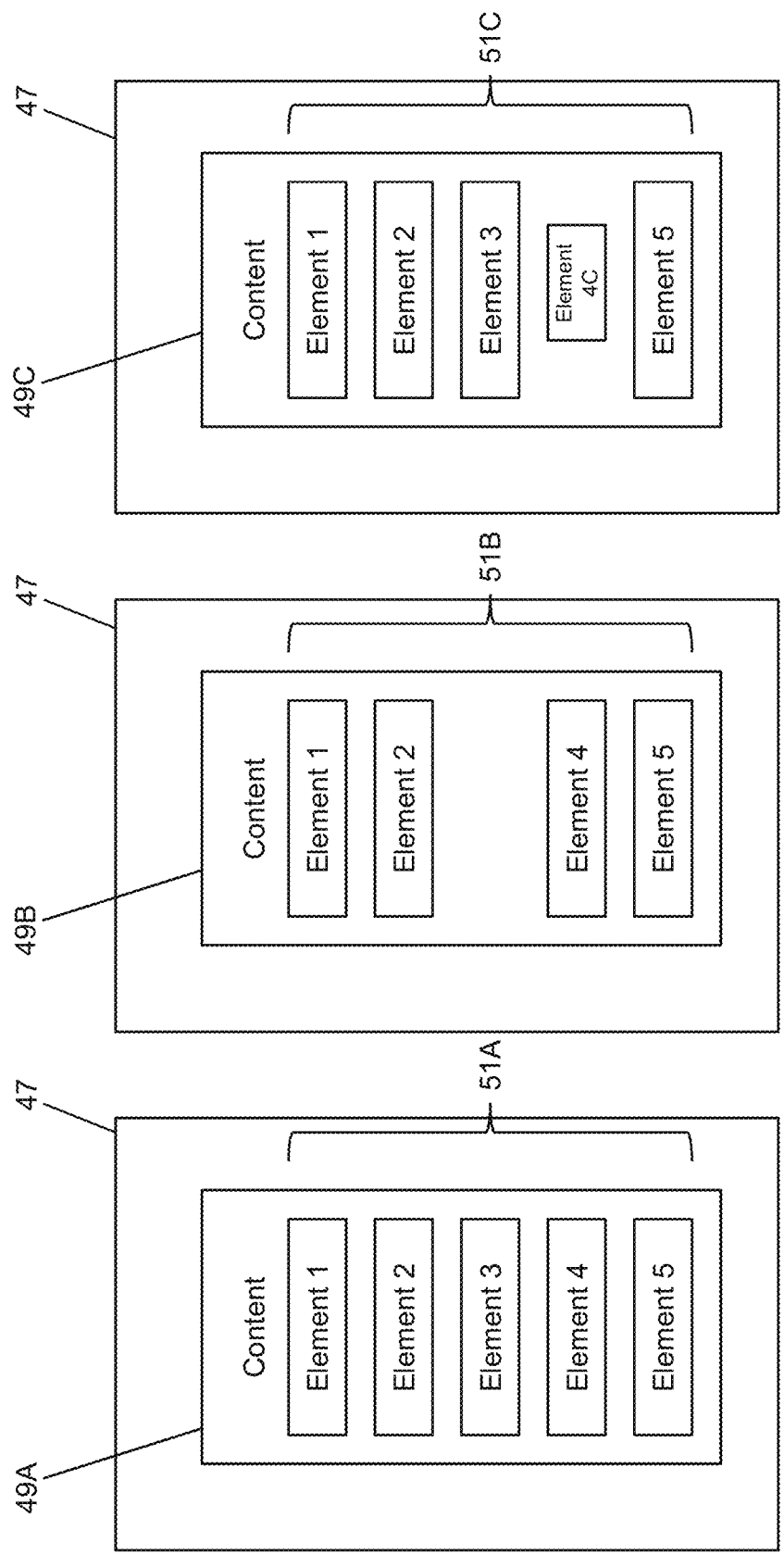
FIG. 5A is an example of a graphical user interface displaying electronic content having a number of elements.
FIG. 5B is an example of the graphical user interface of FIG. 5A with an element of the displayed electronic content being concealed.
FIG. 5C is an example of the graphical user interface of FIG. 5A with an element of the displayed electronic content being modified.

FIG. 5A illustrates an example GUI 47 containing and displaying electronic content 49A having a set of elements 51A, in this example Element 1, Element 2, Element 3, Element 4, and Element 5. The number and nature of each element 51A in FIG. 5A is for illustrative purposes and should not be considered limiting. It may be assumed in this example that the electronic content 49A is created, displayed, shared, and/or owned by a first entity device 23. For example, a user may wish to share content 49A via the GUI 47 but modify or conceal one or more of the elements 51A for certain other entity devices 23.

FIG. 5B illustrates a first modification to the content 49A creating first modified content 49B having a first modified set of elements 51B, in which Element 3 has been concealed. The first modified content 49B may be shared and displayed in this manner for any one or more other entity devices 23.

FIG. 5C illustrates a second modification to the content 49A creating second modified content 49C having a second modified set of elements 51C. In this example, Element 4 has been modified to generate Element 4C, while Element 3 remains. The second modified content 49C may be shared and displayed in this manner for any one or more other entity devices 23.

It can be appreciated that in other examples, both concealing and modifying operations can be applied to different elements within the same content 49 and the examples shown in FIGS. 5B and 5C are shown individually for ease of illustration. It can also be appreciated that the GUI 47 as shown in FIG. 5A may also be representative of a content preview that the user can interact with to, for example, select Element 3 and apply a "conceal" option, or to select Element 4 and apply a modification-type option. Similarly, the content 49A as shown in FIG. 5A may be automatically displayed in the GUI 47 for the owner of the content (e.g., message sender) and the content 49B and/or 49C automatically displayed as shown in FIGS. 5B and 5C for recipients of the shared content 49 (e.g., message recipient(s)).

Referring to FIG. 6, an example embodiment of computer executable instructions for controlling visibility of elements of displayed electronic content 49 is shown. At block 53, the communications tool 46 (or device on which the tool 46 is deployed) provides a user interface that is viewable by a plurality of entity devices 23, including at least one entity device 23 that is sharing the content 49. For example, at block 100 a chat user interface may be provided to a plurality of chat participants, at least one of which has a visibility control 39 for modifying or concealing elements 51 of the content 49. At block 57, the communications tool 46 enables the user interface to display the electronic content 49 with at least one element 51. At block 59, the communications tool 46 uses the visibility control 39 to either access the content filtering criteria data 43 or receive user input to determine filtering criteria to control visibility of the at least one element 51 being displayed in the user interface. At block 61, the visibility control 39 conceals or modifies at least one element 51 of the content 49 as displayed, for at least one entity device 23 (e.g., the GUI 47 as shown in FIGS. 5A, 5B, and 5C).

Figure 7:
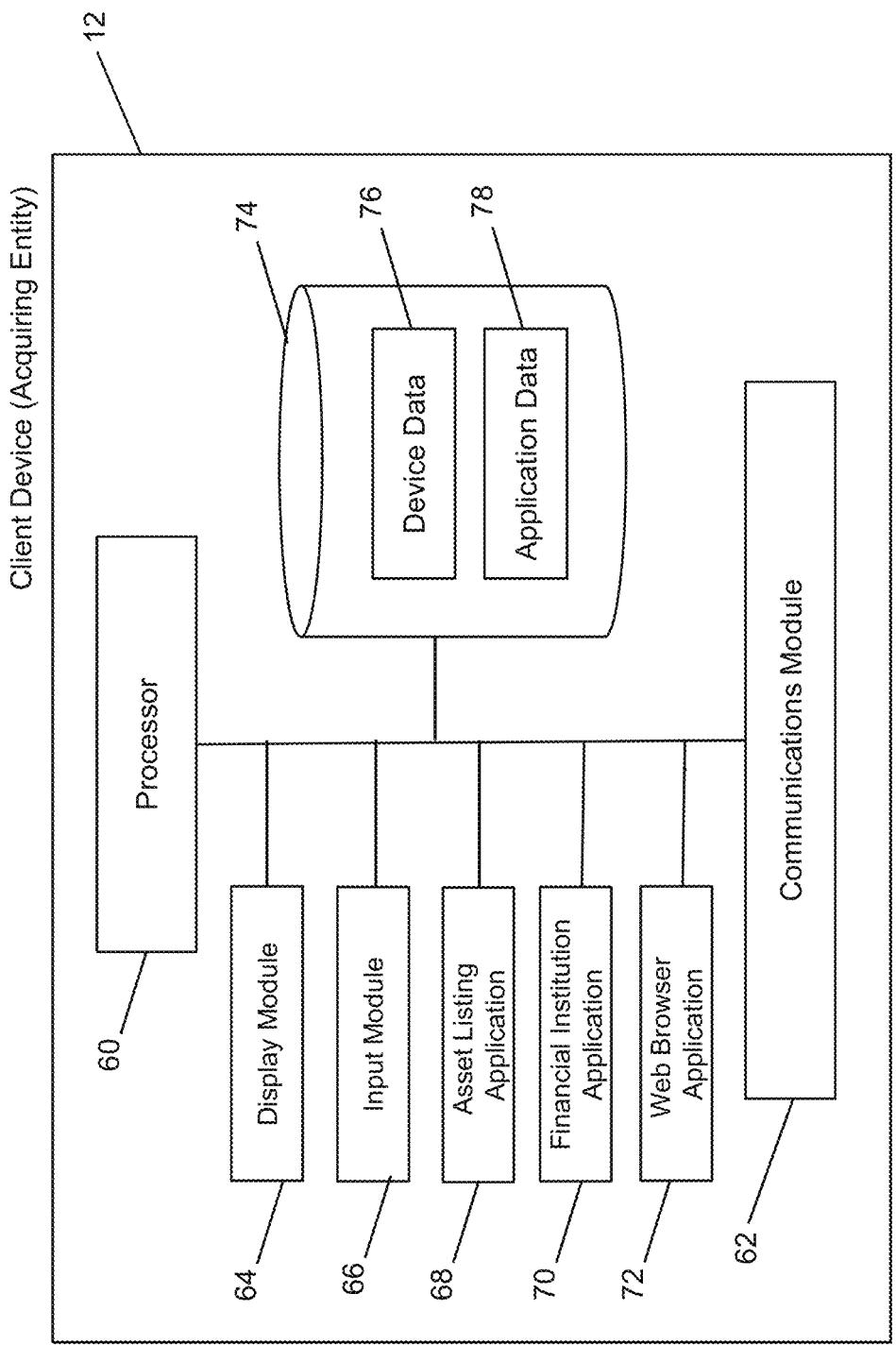
FIG. 7 is a block diagram of an example configuration of a client computing device associated with an acquiring entity.

In FIG. 7, an example configuration of the client device 12 is shown. In certain embodiments, the client device 12 may include one or more processors 60, a communications module 62, and a data store 74 storing device data 76 and application data 78. Communications module 62 enables the client device 12 to communicate with one or more other components of the computing environment 8, such as platform 10, interested party devices 28 or asset listing sites 20 (or one of its components), via a bus or other communication network, such as the communication network 14. While not delineated in FIG. 7, the client device 12 includes at least one memory or memory device that can include a tangible and non-transitory computer-readable medium having stored therein computer programs, sets of instructions, code, or data to be executed by processor 60. FIG. 7 illustrates examples of modules and applications stored in memory on the client device 12 and operated by the processor 60. It can be appreciated that any of the modules and applications shown in FIG. 7 may also be hosted externally and be available to the client device 12, e.g., via the communications module 62.

In the example embodiment shown in FIG. 7, the client device 12 includes a display module 64 for rendering GUIs and other visual output on a display device such as a display screen, and an input module 66 for processing user or other inputs received at the client device 12, e.g., via a touchscreen, input button, transceiver, microphone, keyboard, etc. The client device 12 may also include an asset listing application 68, which may be a customized app provided by the platform 10 for use by the entities in the computing environment 8. Similarly, the client device 12 may include a financial institution application 70 provided by their financial institution system 16, e.g., for performing mobile banking operations. The client device 12 in this example embodiment also includes a web browser application 72 for accessing Internet-based content, e.g., via a mobile or traditional website. The data store 74 may be used to store device data 76, such as, but not limited to, an IP address or a MAC address that uniquely identifies client device 12 within environment 8. The data store 74 may also be used to store application data 78, such as, but not limited to, login credentials, user preferences, cryptographic data (e.g., cryptographic keys), etc.

It will be appreciated that only certain modules, applications, tools and engines are shown in FIGS. 2 and 7 for ease of illustration and various other components would be provided and utilized by the client device 12 and platform 10 as is known in the art. It will also be appreciated that the configuration of the asset listing sites 20 and interested party devices 28 may be similar to that shown in FIG. 2 or 7, including the inclusion of an asset listing application 68 and its functionality.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers in platform 10 or financial institution system 16, client device 12, entity device 23, owner entity device 23', or interested party device 28, or accessible or connectable thereto. Any application or module herein described may be implemented using computer readable/executable instructions that may be stored or otherwise held by such computer readable media.

Figure 8:
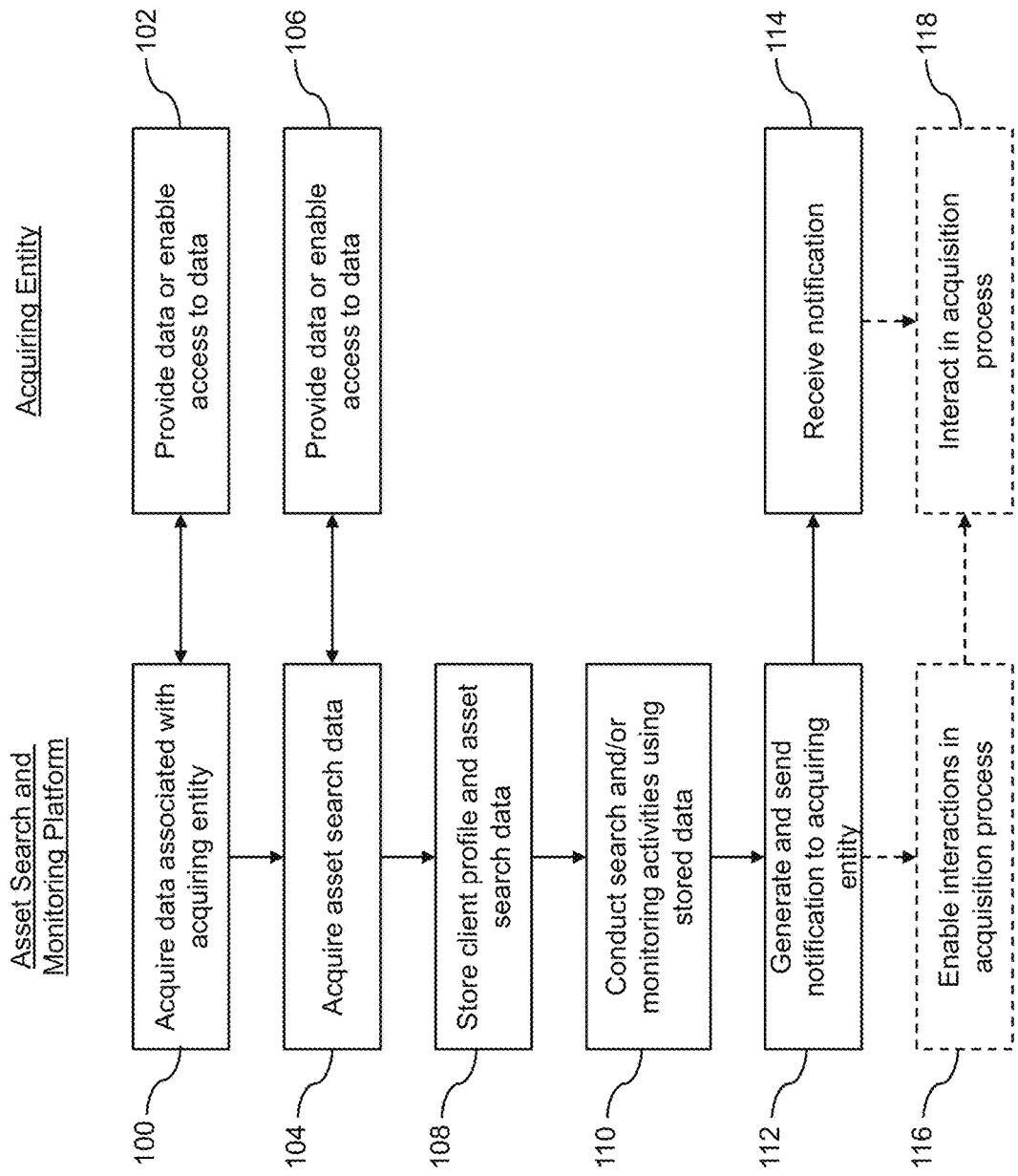
FIG. 8 is a flow diagram of an example of computer executable instructions for conducting search and monitoring of assets available for acquisition and notifying acquiring entities of search results.
Figure 9:
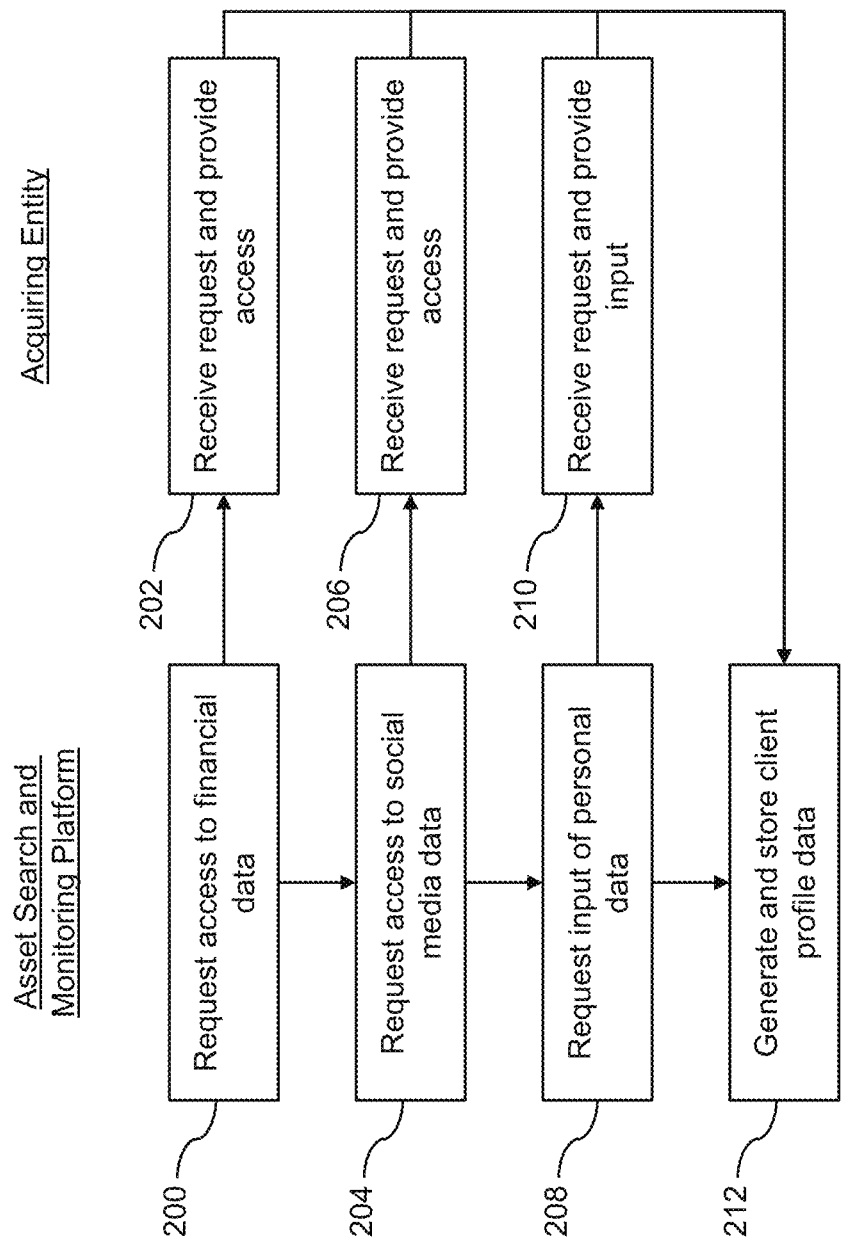
FIG. 9 is a flow diagram of an example of computer executable instructions for obtaining access to data for populating a client profile.

Referring to FIG. 8, an example embodiment of computer executable instructions for conducting search and monitoring of assets available for acquisition and notifying acquiring entities of search results is shown. At block 100, the platform 10 acquires data associated with the acquiring entity to populate the client profile data 24. The data associated with the acquiring entity may have been provided previously, e.g., upon registering with the platform 10 and/or may be periodically acquired automatically or in communication with the acquiring entity. In this example embodiment, the acquiring entity provides such data or enables access to such data at block 102. Examples of providing or enabling access to such user or client data is illustrated in FIG. 9 described below.

Figure 10:
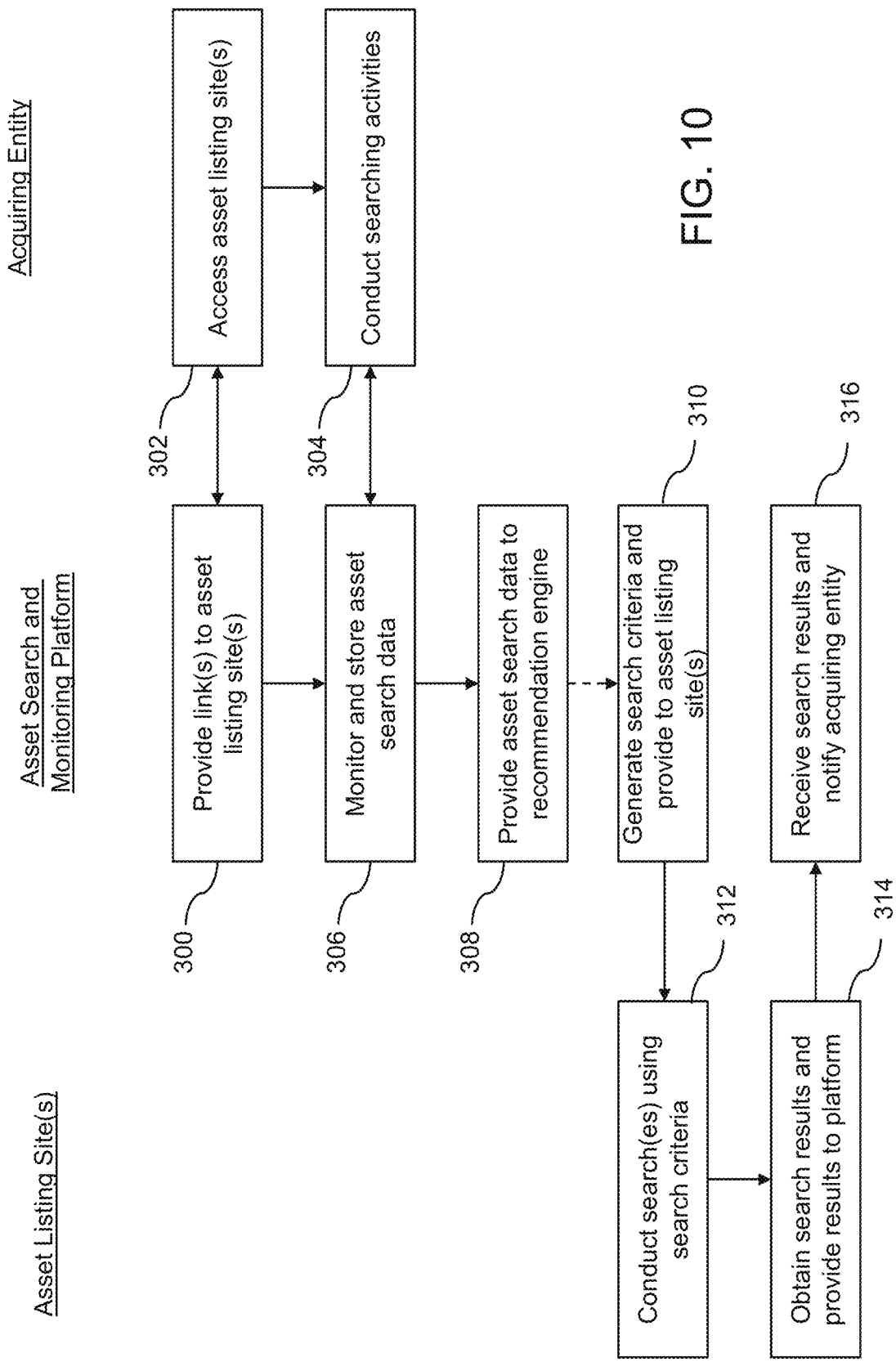
FIG. 10 is a flow diagram of an example of computer executable instructions for monitoring search activities by an acquiring entity and providing search criteria to an asset listing site for obtaining new search results.

At bock 104, the platform acquires asset search data, e.g., home listing search data. This asset search data is acquired to populate the asset search data 26. In this example embodiment, the acquiring entity provides the asset search data or enables access to the data, e.g., by providing login credentials to an asset listing site 20 used by the acquiring entity at block 106. The acquiring entity may also connect or link to certain asset listing sites 20 via the platform 10 and provide suitable permissions to enable the platform 10 to monitor interactions with those certain asset listing sites 20. An example of providing or enabling access to such search data is illustrated in FIG. 10 described below.

At block 108, the platform 10 stores client profile data 24 and asset search data 26 for the acquiring entity in the datastore 22. Obtaining data from the acquiring entity may include obtaining access to the financial data 18 for the acquiring entity and at least some of this financial data 18 may be stored in the client profile data 24. It will be appreciated that in example embodiments where the financial institution system 16 hosts the platform 10, the financial data 18 may already be available to the platform 10.

At block 110, the platform 10 uses the recommendation engine 36 to conduct searching and/or monitoring activities used the stored client profile data 24, asset search data 26, and financial data 18. Based on the activities conducted by the recommendation engine 36, the platform 10 may generate and send one or more notifications to the acquiring entity at block 112. For example, the platform 10 may generate search criteria and access an asset listing site 20 not previously used by the acquiring entity to provide a search result list associated with that asset listing site 20. Similarly, the recommendation engine 36 may be used to generate a refined set of search criteria to periodically monitor one or more asset listing sites 20 to provide ongoing search results to the acquiring entity.

Figure 13:
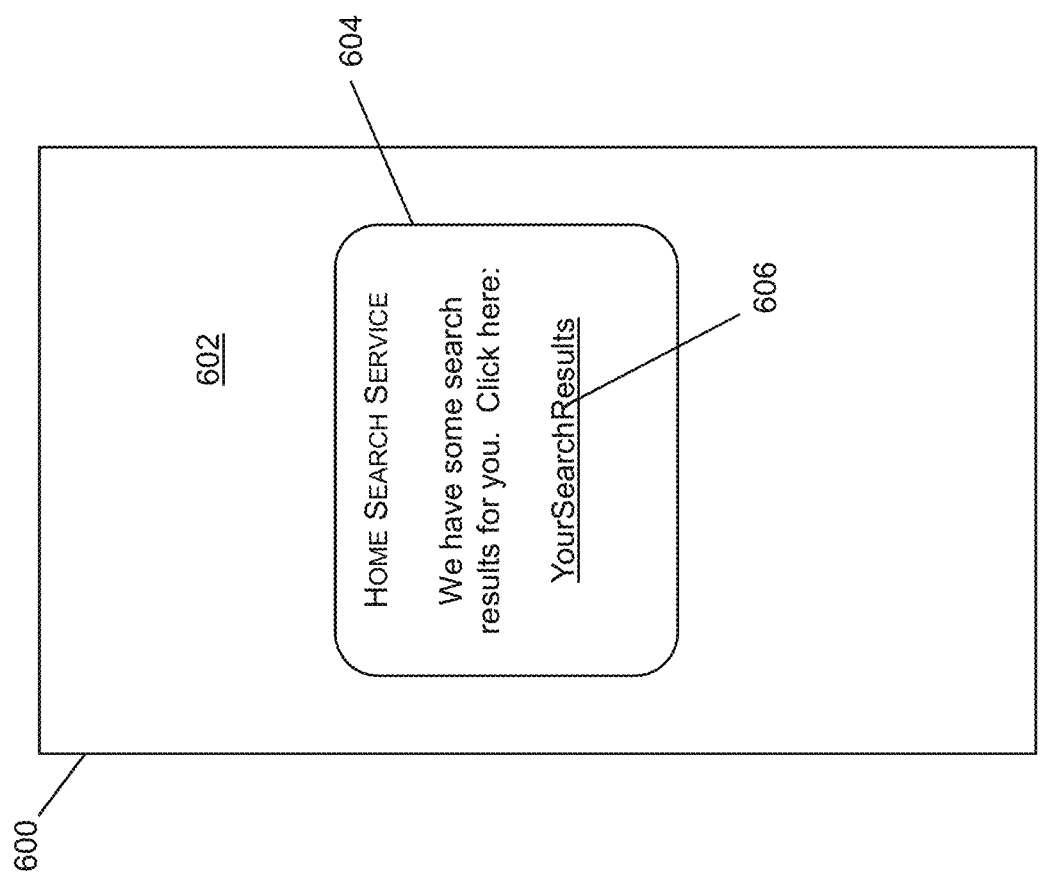
FIG. 13 is an example of a graphical user interface of a search notification.

At block 114, the acquiring entity receives the notification, e.g., via the asset listing application 68, financial institution application 70, web browser application 72 or other application on the client device 12. The notification may be delivered by way of an existing communication type such as an email, text message or alert, or may be delivered using a custom pop-up message or other visual element on the client device 12 or another device associated with that acquiring entity. An example of such a notification is shown in FIG. 13 and described below.

The platform 10 may also be configured to assist the acquiring entity not only with searching and monitoring assets available for acquisition, but also to interact or engage in the acquisition process, e.g., to initiate a home buying process by incorporating interested parties such as realtors, lawyers, inspectors, mortgage brokers, etc. At block 116, the platform enables interactions in the acquisition process, which enables the acquiring entity to interact in the acquisition process at block 118, e.g., by initiating a chat with a realtor to schedule a viewing of a property found by the platform 10 in conducting the monitoring and searching activities described herein.

The platform 10 may obtain access to certain client profile data 24 that is associated with an acquiring entity, e.g., at block 102 in FIG. 8. Referring to FIG. 9, an example embodiment of computer executable instructions for obtaining access to data for populating a client profile is shown.

At block 200 the platform 10 requests access to financial data 18 and provides this request to the acquiring entity. At block 202 the acquiring entity receives the request for financial data 18 and provides access to the platform 10 in this example embodiment. It can be appreciated that the financial data 18 can be accessed directly when the platform 10 is associated with or provided directly by the financial institution system 16. The financial data 18 may also be entered by the acquiring entity when establishing a profile with the platform 10, e.g., via a questionnaire or other input mechanism. Full or partial access to the financial institution system 16 may also be provided to enable the client profile data 24 to have access to current and periodically changing financial data 18.

At block 204 the platform 10 requests access to social media data to obtain preferences and personality traits, searching and viewing histories, "likes", reposts, among other things, and provides this request to the acquiring entity. At block 206 the acquiring entity receives the request for social media data and provides access to the platform 10 in this example embodiment. Providing access in this example embodiment may include providing sign-in credentials or a permission to enable the platform 10 to directly access the social media data automatically and periodically. The permission may be an opt-in by the acquiring entity that the platform 10 can utilize publicly available social media data for that user. Access to private social media data can also be provided with the credentials.

At block 208 the platform 10 requests the input of certain personal data, to obtain other preferences and personality traits, or other data not available through social media, and provides this request to the acquiring entity. At block 210 the acquiring entity receives the request for the input of personal data and provides input to the platform 10 in this example embodiment. Providing input of personal information may include a questionnaire or survey or other input mechanism provided to the acquiring entity, e.g., via the realtor referral and interface application 68.

At block 212 the platform 10 generates and stores the client profile data 24 for that acquiring entity via the databases interface module 34. The process shown in FIG. 9 may be initiated when registering a new user, periodically performed to update and refresh the client profile data 24, or both.

The platform 10 may also provide access to, or otherwise be associated with the asset listing sites 20 to enable the platform 10 to monitor search activities of the acquiring entity and to generate its own search criteria and conduct monitoring and searching activities on behalf of the acquiring entities, e.g., in part illustrated at block 106 in FIG. 8. Referring to FIG. 10, an example embodiment of computer executable instructions for monitoring search activities by an acquiring entity and providing search criteria to an asset listing site for obtaining new search results. At block 300, the platform provides one or more links to asset listing sites 20 to enable the acquiring entity to access one or more of these asset listing sites 20 at block 302, e.g., using the client device 12. By accessing the asset listing sites 20 the acquiring entity is able to engage in conducting searching activities at block 304. For example, the acquiring entity may use the platform 10 to find suitable sites 20 to begin their home buying journey by exploring prices and inventory in a certain geographic area.

At block 306, the platform 10 may use access to the asset listing site(s) 20 via the API 21 to monitor and store asset search data 26 that can be associated with corresponding client profile data 24 in the datastore 22. This enables the platform 10 to provide the asset search data 26 and any relevant client profile data 24 to the recommendation engine 36 at block 308. The platform 10 may then use the recommendation engine 36 to generate search criteria and provide or otherwise utilize same with one or more asset listing sites 20 at block 310. It will be appreciated that, as indicated in dashed lines, block 310 may be executed separately from blocks 300 to 308 and/or at a later point in time. It will also be appreciated that block 310 may be executed using the same asset listing site(s) 20 (e.g., to monitor certain properties or look for new properties), and/or using one or more sites 20 not previously used by the acquiring entity or observed by the platform 10 in generating the asset search data 26.

At block 312, the asset listing site(s) 20 use the search criteria provided by the platform 10 to conduct one or more searches using the search criteria, to obtain search results (which may include evaluating and ranking or recommending listings in the search results) and return those to the platform 10 at block 314.

At block 316, the platform 10 receives the new search results and may notify the acquiring entity, e.g., of new assets to consider, new prices associated with previously searched assets, among other information that can be extracted from the new search results. For example, the acquiring entity can be notified when a price reduction occurs, statistics regarding acquisition values, when a listing becomes inactive (e.g., if it has been sold), etc.

Figure 11:
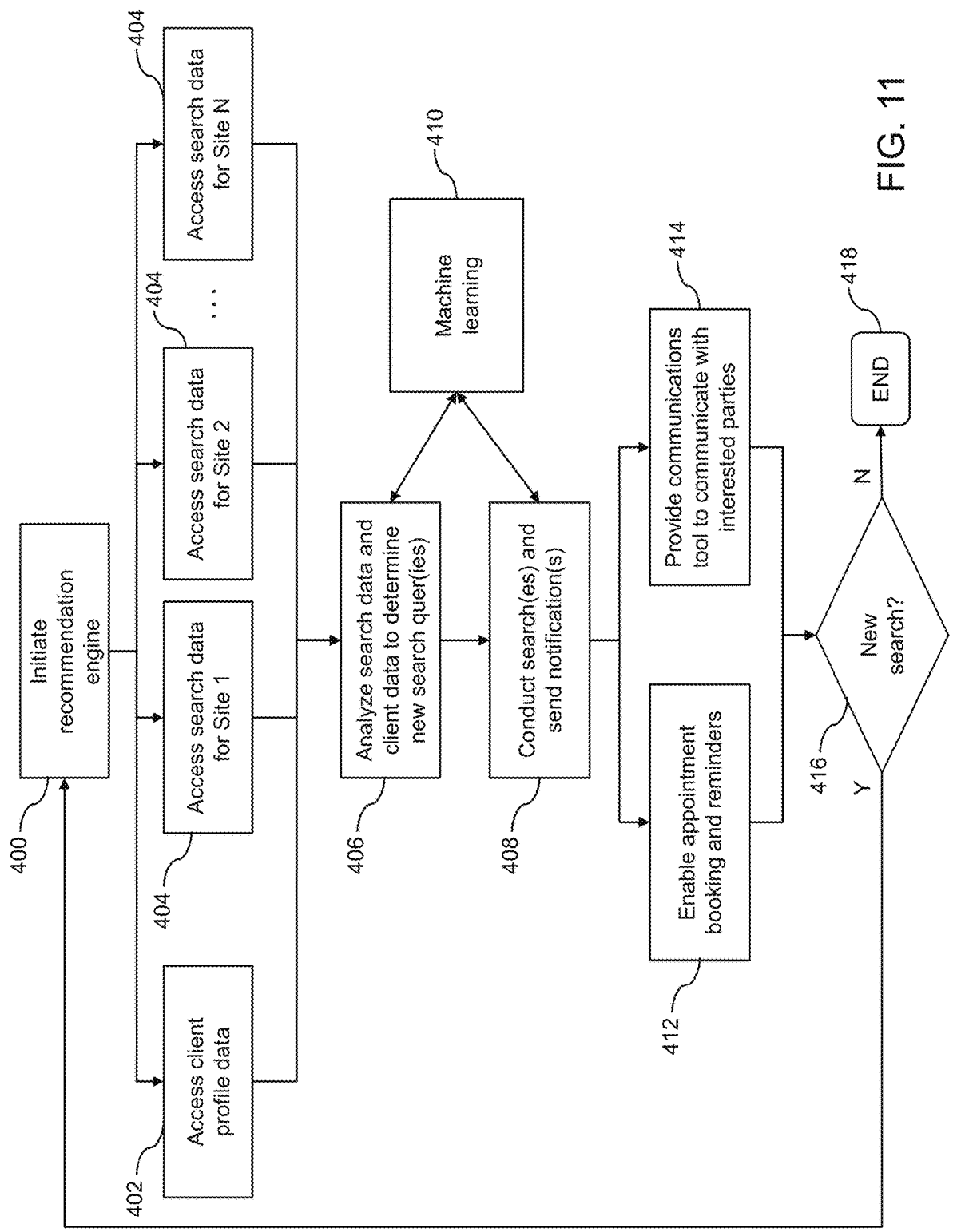
FIG. 11 is a flow diagram of an example of computer executable instructions for executing searching and recommendation processes.

Referring to FIG. 11, an example embodiment of computer executable instructions for executing searching and recommendation processes is shown. At block 400 the platform 10 initiates the recommendation engine 36 as herein described. At block 402, the recommendation engine 36 uses the databases interface module 34 to access the client profile data 24 associated with the acquiring entity or more generally the user as herein described. It will be appreciated that block 402 may also include accessing financial data 18, either separately or from financial data 18 stored in the client profile data 24 by the platform 10.

At block 404, the recommendation engine 36 may also use the databases interface module 34 to access the asset search data 26 for each asset listing site 20 that is associated with the acquiring entity and that is to be analyzed for the searching and recommendation process. The recommendation engine 36 uses the machine learning engine 38 to execute machine learning processes at block 410 as herein described. This may include analyzing the data accessed in blocks 402 and 404 to classify data such that relevant parameters can be identified and used to determine a highest match between the content in the client profile data 24 and the content in the search data 26 to determine one or more new search queries at block 406. The process implemented at block 406 may be used to generate and utilize one or more sets of search criteria with one or more asset listing sites 20 to obtain content for one or more relevant notifications for the acquiring entity at block 408. At block 408, various searching and monitoring processes can be utilized as described herein. It will be appreciated that the recommendation engine 36 may also be executed on the new search results to evaluate or recommend certain listings in those search results.

In addition to sending the notifications to the acquiring entity, the platform 10 may also enable appointment booking and reminders regarding the acquisition process at block 412. For example, after sending a notification of additional search results or an update to a previously searched asset, the acquiring entity may utilize the platform 10 to begin chatting with interested parties and proceed further in the acquisition process. For example, in searching for a home, the acquiring entity may wish to schedule a viewing, make an offer, or conduct additional searching for comparison pricing, etc. The platform 10 may therefore also provide the communications tool 46 at block 414, to enable the acquiring entity to communicate with interested party devices 28.

At block 416, the platform 10 determines whether a new search is to be conducted. This may be triggered by activities of the acquiring entity or may be periodically performed automatically by the platform 10. If a new search is to be conducted, the process may be repeated by returning to block 400. If a new search is not to be conducted, the process ends at block 418.

Figure 12:
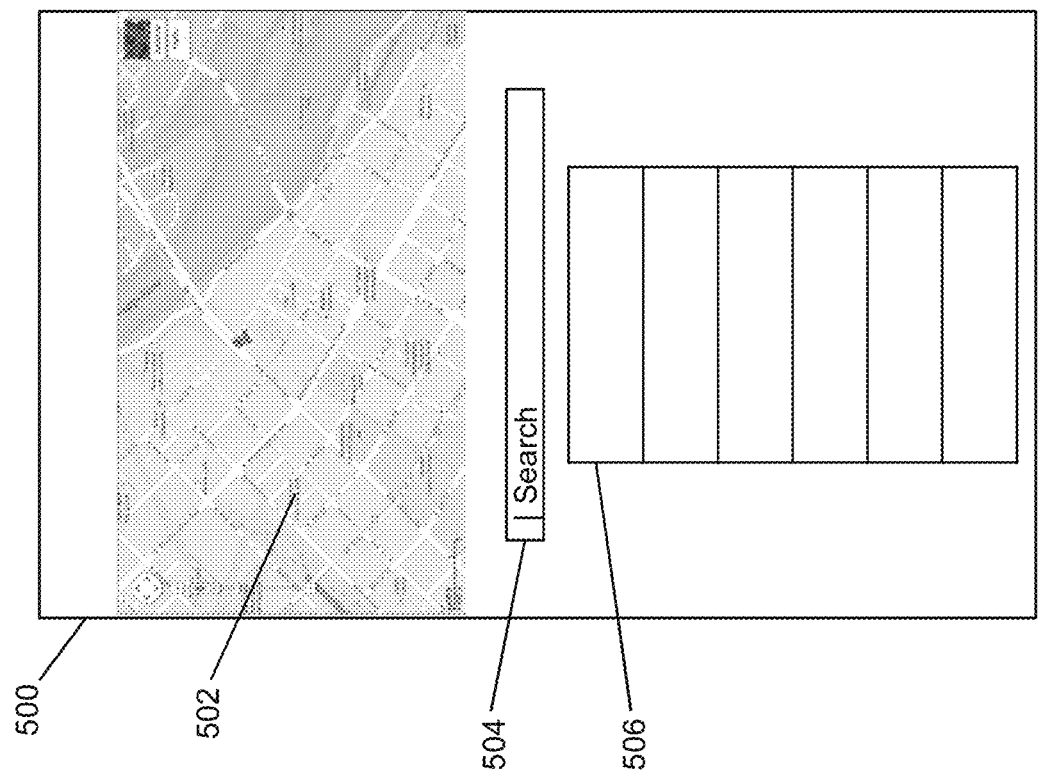
FIG. 12 is an example of a graphical user interface of a real estate listing search tool.

Referring to FIG. 12, an example of a GUI of a real estate listing search tool 500 is shown. The GUI 500 may include a search entry box 504, a map output 502, and a search results list 506. By engaging in the search activities as illustrated in FIG. 12, the platform 10 through the API 21 may monitor and store search activities as herein described.

Referring to FIG. 13, an example of a GUI of a search notification 604 is shown. In the example embodiment shown in FIG. 13, an application GUI 600 is shown without any details provided to indicate that the notification 604 may be displayed as an alert in or over any application portion 602, including the asset listing application 68, financial institution application 70 or web browser application 72 shown in FIG. 7. The notification 604 may include any suitable notification text, such as in this example: "We have some search results for you. Click here:". The notification 604 may also include a link 606 to access the content associated with the notification 604, in this example a set of new search results obtained for the acquiring entity by the platform 10. It can be appreciated that the notification 604 can also be displayed by another entity such as the financial institution system 16 with the link directing the user to the platform 10. That is, the platform 10 can be a stand-alone entity, or can be integrated, affiliated or provided by another entity, such as an entity already known to the user (e.g., a financial institution).

Figures 14, 15:
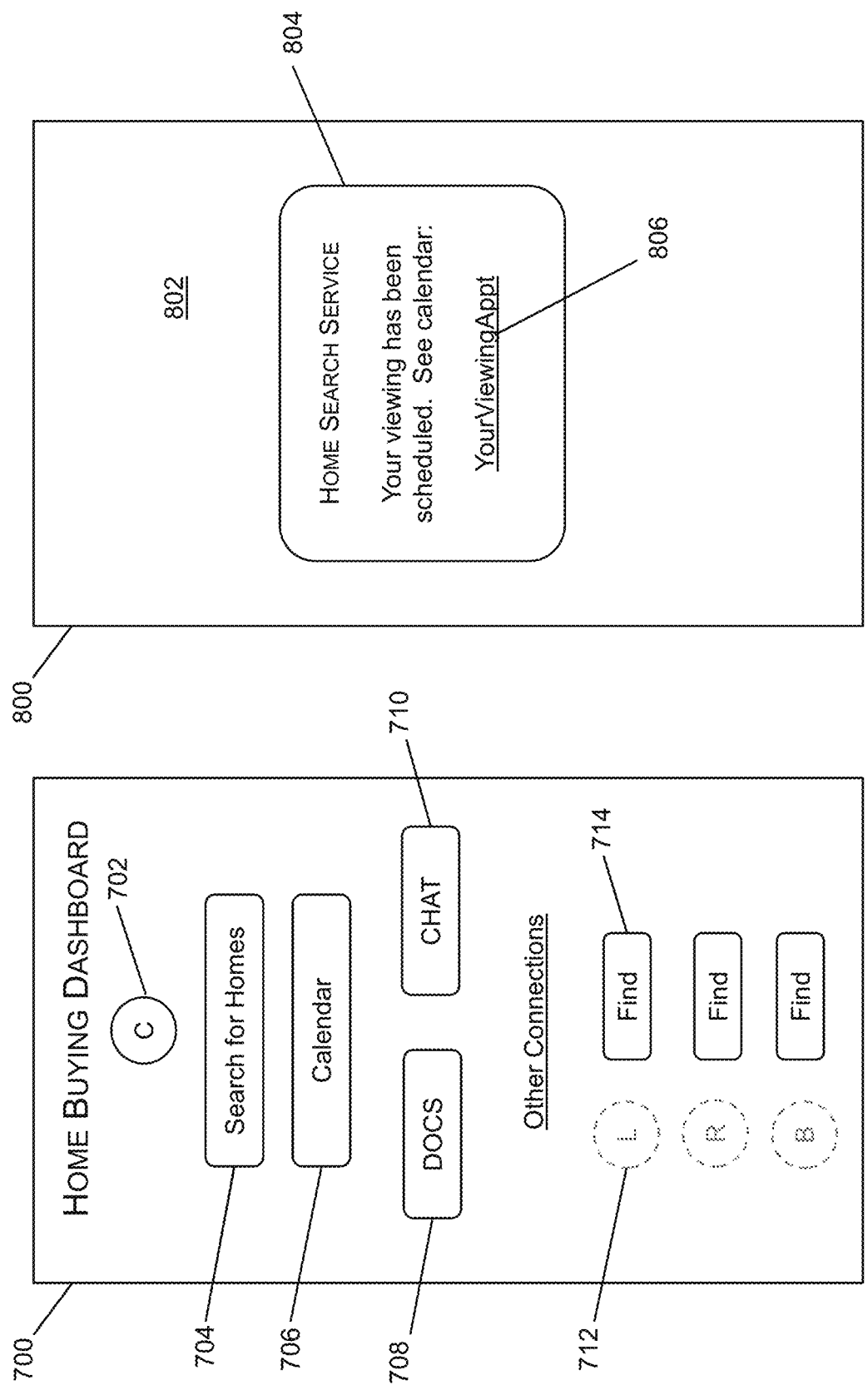
FIG. 14 is an example of a graphical user interface of a home buying dashboard.
FIG. 15 is an example of a graphical user interface of an appointment notification.

Referring to FIG. 14, an example of a GUI of a home buying dashboard 700 is shown. The home buying dashboard 700 may be provided via the asset listing application 68. The home buying dashboard 700 is associated with the client device 12 and its user, and in this example embodiment identifies the user with a user profile image 702 containing the letter "C". It will be appreciated that the user profile image 702 may be a character, avatar, photo, emoji, or other visual element. The dashboard 700 also includes a Search for Homes option 704 that may be used to initiate access to an asset listing site 20.

The dashboard 700 also includes a Calendar option 706 that may be used to provide access to the appointment scheduling tool 48 of the platform 10 or an integrated or associated other calendar such as a user calendar. The dashboard 700 may also include a DOCS option 708, which may be selected to access a document sharing tool (not described herein), and a CHAT option 710, which may be selected to access the communications tool 46. A series of profile images 712 for other connections (e.g. interested parties) may also be displayed, with each image 714 being populated (shown in dashed grey in FIG. 14 to illustrate a yet-to-be-added connection) as interested parties are connected via the platform 10. It will be appreciated that the platform 10 may also be used to connect and interface the acquiring entity with other advisors, as described in co-pending U.S. patent application Ser. No. 16/275,087 filed on Feb. 13, 2019 and entitled "System and Method for Interfacing Entities Engaged in Exchange Activities", the contents of which are incorporated herein by reference. It will also be appreciated that the platform 10 may have the acquiring entity connect and interface with a realtor before other advisors, according to processes described in co-pending U.S. patent application Ser. No. 16/275,178 filed on Feb. 13, 2019 and entitled "System and Method for Interfacing Acquiring Entities and Realtors", the contents of which are incorporated herein by reference.

Referring to FIG. 15, an example of a GUI of an appointment notification 804 is shown. In the example embodiment shown in FIG. 15, an application GUI 800 is shown without any details provided to indicate that the notification 804 may be displayed as an alert in or over any application portion 802, including the asset listing application 68, financial institution application 70 or web browser application 72 shown in FIG. 7. The notification 804 may include any suitable notification text, such as in this example: "Your viewing has been scheduled. See calendar:". The notification 804 may also include a link 806 to access the calendar appointment associated with the notification 804. It will be appreciated that the platform 10 may therefore engage with the acquiring entity to assist with next steps in the acquisition process. For example, specific actions or events may be captured in a calendar as shown in FIG. 15, and/or other general reminders may be generated. For example, periodic reminders regarding what the acquiring entity should be doing next may be provided to assist them in the acquisition process. One example reminder may include a reminder to obtain a pre-approval for a mortgage, schedule an inspection once a viewing has been arranged, etc. It can be appreciated that the notification 804 can also be displayed by another entity such as the financial institution system 16 with the link directing the user to the platform 10. That is, the platform 10 can be a stand-alone entity, or can be integrated, affiliated or provided by another entity, such as an entity already known to the user (e.g., a financial institution).

FIG. 16 is an example embodiment of a GUI of a virtual chat session 900 provided via the communications tool 46. The chat session 900 allows the acquiring entity (denoted as the "Client" in this example) to communicate with entities in the computing environment 8 such as interested party devices 28. In FIG. 16, a first client message 902 is sent, which indicates: "@Realtor, I am ready to see this listing . . . " with a link to a listing. By having a realtor interfaced as an interested party via the platform 10, the acquiring entity may receive a first realtor message 904 indicating: "Sounds good, I will book a viewing". In this example, the platform 10 detects or is notified of a booking for the viewing, generates an appointment for the appointment scheduling tool 48, and issues a platform message 906 indicating: "Your viewing has been booked . . . " with a link 908 to the appointment. It will be appreciated that the platform message 906 provides a similar function as the notification 804 in FIG. 15.

As discussed above, the visibility control 39 may be used by the communications tool 46 to selectively control what data and information is seen by certain entities communicating through the communications tool 46. For example, an acquiring entity may include potentially sensitive information in a message directed to a realtor, lawyer, or mortgage broker, but wish to add additional parties to a group chat. Rather than begin a new chat or to communicate via multiple chats, the platform 10 may use the visibility control 39 of the communications tool 46 to selectively redact or alter message content as seen from different perspectives. It can be appreciated that the visibility control 39 may also be provided by the access control module 44.

FIG. 17 is an example embodiment of a GUI of another virtual chat session 920A provided via the communications tool 46, from the perspective of the acquiring entity. In this example, a client message 922A includes the following content: "Search results look good. My budget is $500 k, I have $150 k in income". A realtor message 924A indicates: "Sounds good, I will book some viewings!", a sibling message 926A indicates: "Agreed, but remember you hate to renovate . . . ", an inspector message 928A indicates: "I can be available next week for an inspection . . . ", and a mortgage broker message 930A indicates: "I will get the pre-approval now!". Since the acquiring entity is the owner of the content in the client message 922A, it may view the entire content from its perspective. In this example embodiment, it is assumed that this content includes at least some potentially sensitive information that the platform 10 identifies (e.g., using the machine learning engine 38) and selectively redacts or alters for each of the other perspectives in the chat, where appropriate.

FIG. 18 is an example embodiment of a GUI of the virtual chat session 920B, from the perspective of a realtor. Each message 922-930 includes the suffix "B" to indicate its version from the perspective of the realtor. In this example, the client message 922B is altered when compared to FIG. 17 wherein a content portion 932B indicates an income range rather than an exact income. This is illustrative of an alteration to the content of the message that takes into account that the realtor, as a "secondary participant type", does not require exact income (at least at this stage of the process) but may require an income range to assess financial viability of the home search and budget. The other messages 924B, 926B, 928B, and 930B include the same content, but are aligned to indicate incoming messages.

FIG. 19 is an example embodiment of the virtual chat session 920C, from the perspective of an inspector. Each message 922-930 includes the suffix "C" to indicate its version from the perspective of the inspector. In this example, the client message 922C is altered when compared to FIGS. 17 and 18, wherein another content portion 932C indicates a broad price range rather than a budget. Moreover, it may be seen that the content portion 932B is not seen by the inspector. These are illustrative of alterations to the content of the message that takes into account that the inspector does not income data at all and may only require a broad range of budget to assess the scope of their inspection. The other messages 924C, 926C, 928C, and 930C include the same content, but are aligned to indicate incoming messages.

Figures 20, 21:
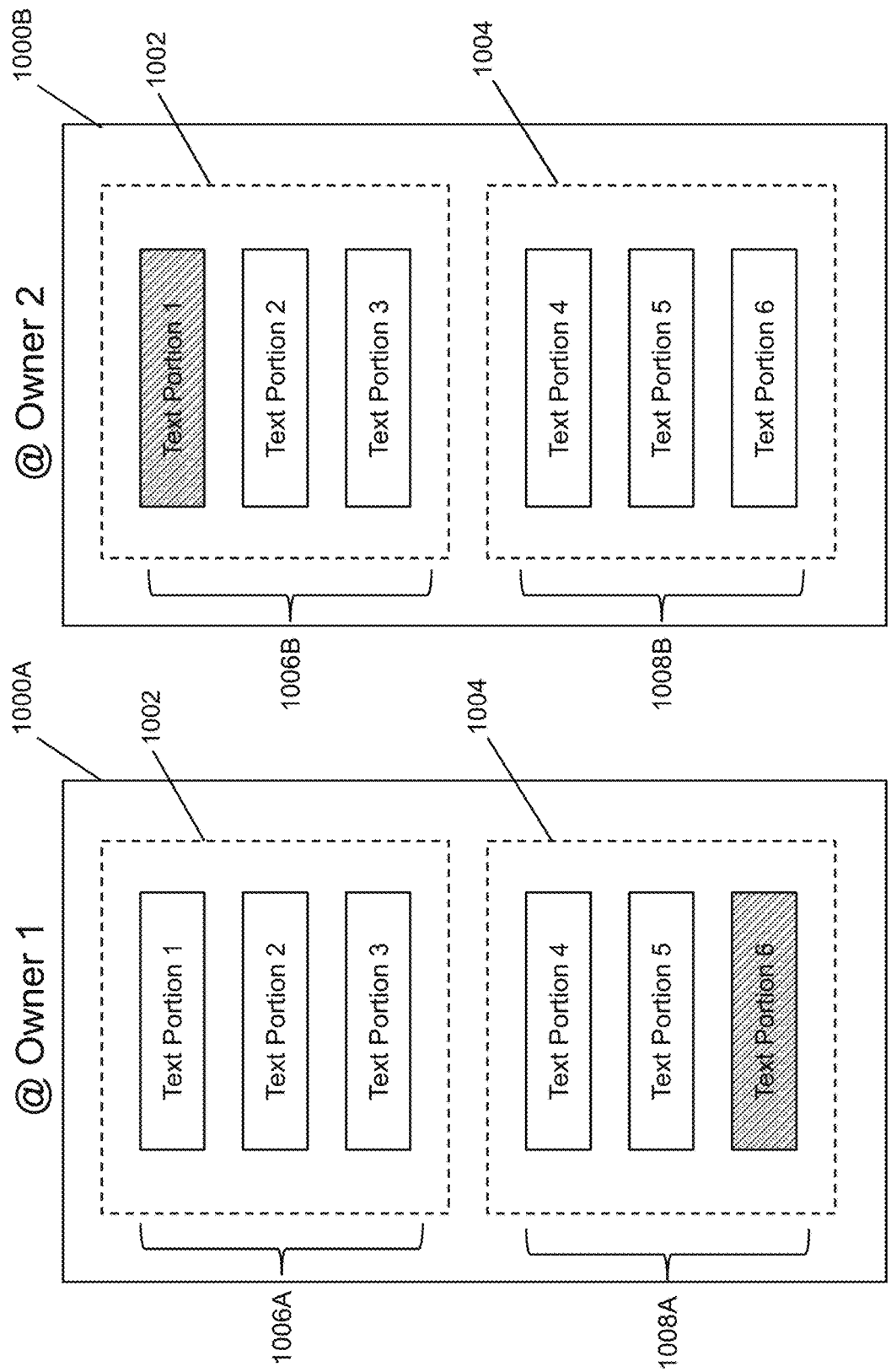
FIG. 20 is an example of a graphical user interface of a shared document having multiple owners, from a perspective of a first owner.
FIG. 21 is an example of a graphical user interface of the shared document of FIG. 20, from a perspective of a second owner.
Figure 22:
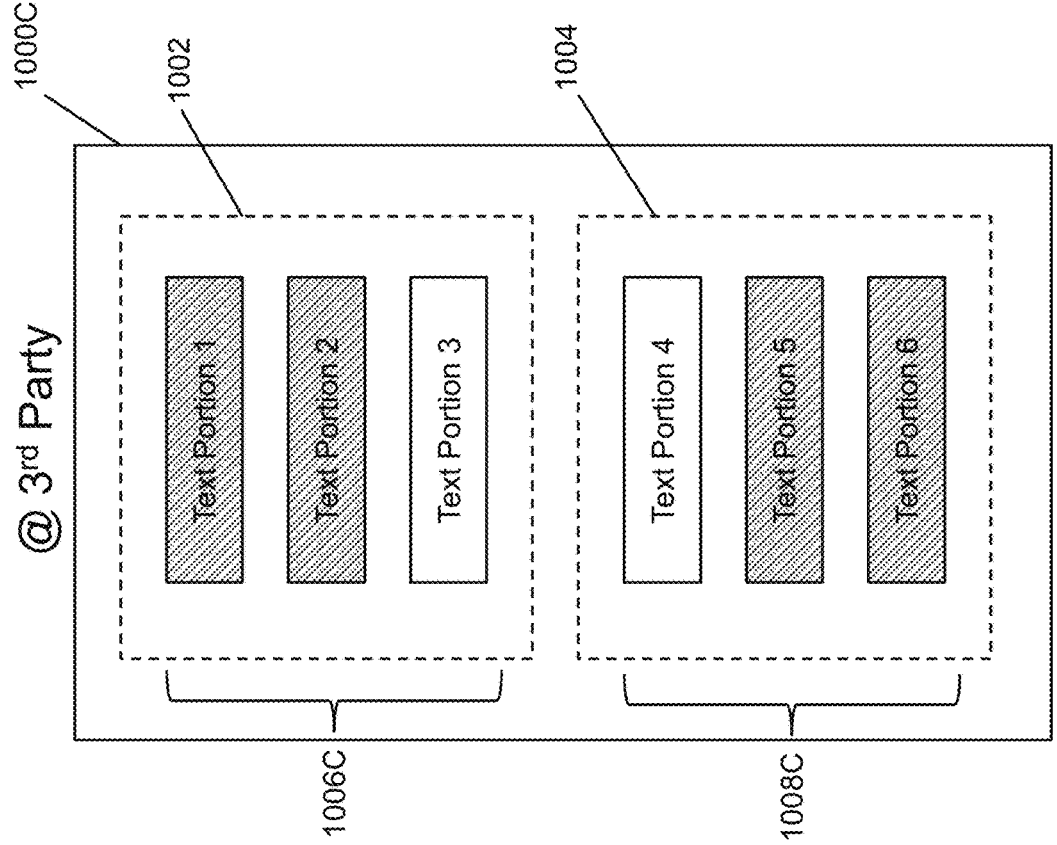
FIG. 22 is an example of a graphical user interface of the shared document of FIG. 20, from a perspective of a third party.

FIGS. 20 to 22 illustrate another example embodiment for selectively controlling the visibility of electronic content to be displayed by entity devices 23. In this example embodiment, a GUI displaying a document 1000 having multiple text portions 1006 is modified and includes multiple owners, namely first and second owner entity devices 23'. In FIG. 20 a first owner entity device 23' (illustrated as Owner 1) displays a first document version 1000A that includes a first portion 1002 associated with or "owned" by Owner 1 having a first set of text portions 1006A, and its version of a second portion 1004 associated with or owned by a second owner entity device 23' (illustrate as Owner 2 in FIG. 21) having a second set of text portions 1008A. In FIG. 20 it can be observed that for Owner 1, Owner 2 has opted to conceal or modify Text Portion 5 of the second set of text portions 1008A but has shared Text Portions 4 and 5. Since the first document version 1000A is displayed by Owner 1, Text Portions 1, 2, and 3 are visible to Owner 1.

In FIG. 21, Owner 2 displays a second document version 1000B showing the first and second portions 1002, 1004 of the document. The first portion 1002 has its version of the first set of text portions 1006A, and the second portion 1004 has the second set of text portions 1008B. In FIG. 21 it can be observed that for Owner 2, Owner 1 has opted to conceal or modify Text Portion 1 in its version of the first set of text portions 1006B but has shared Text Portions 2 and 3. Since the second document version 10006 is displayed by Owner 2, Text Portions 4, 5, and 6 are visible to Owner 2.

In FIG. 22, a third document version 100C is shared by Owner 1 and Owner 2 with a third-party entity device 23 (illustrated as 3$^{rd}$ Party in FIG. 22), e.g., a non-owner of the electronic content or another entity that has not requested any controls on the visibility of the electronic content being displayed. In FIG. 22 it can be observed that for the 3$^{rd}$ Party, Owner 1 has opted to conceal or modify Text Portions 1 and 2 but share Text Portion 3, and Owner 2 has opted to conceal or modify Text Portions 5 and 6 but share Text Portion 4. That is, Owners 1 and 2 of the shared document 1000 have opted to share less content with third parties than with each other. It can be appreciated that the visibility control 39 may be used to determine filtering criteria for one or multiple owners of the shared electronic content, which can be either automatically determined or selected in real-time before being displayed for certain other parties. It can also be appreciated that the application of the filtering criteria may be applied during an active session that uses the corresponding user interface, or in an offline interaction with the corresponding user interface.

Figure 23:
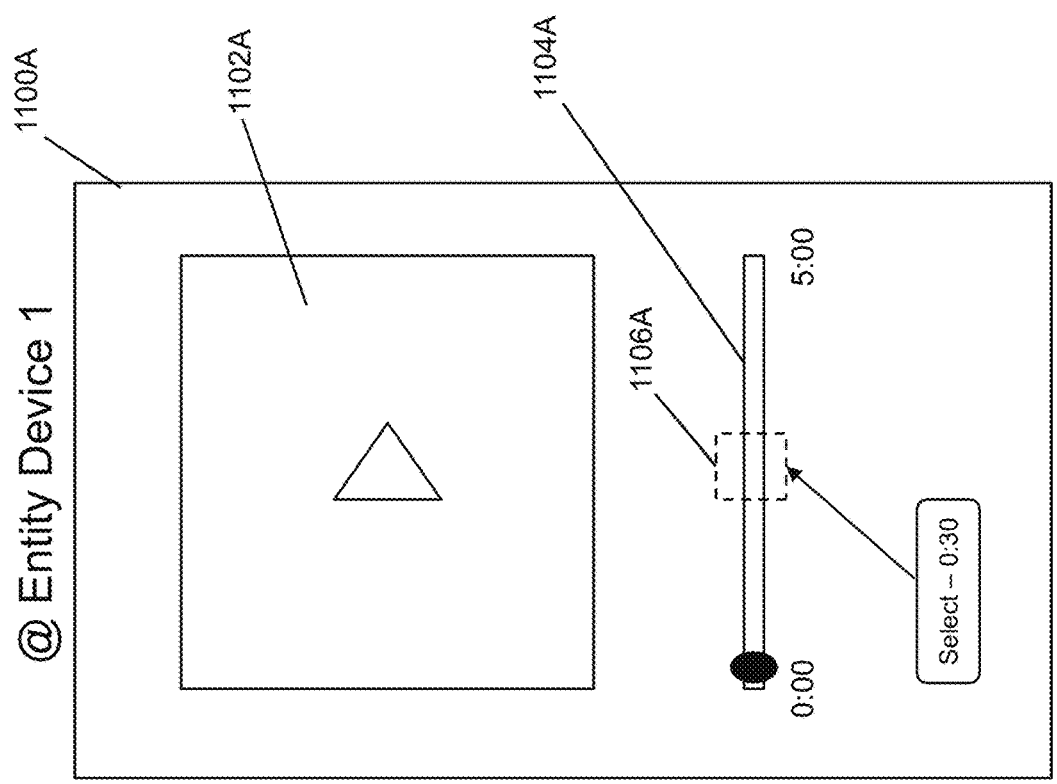
FIG. 23 is an example of a graphical user interface providing shared multi-media content, from a perspective of a first entity device.
Figure 25:
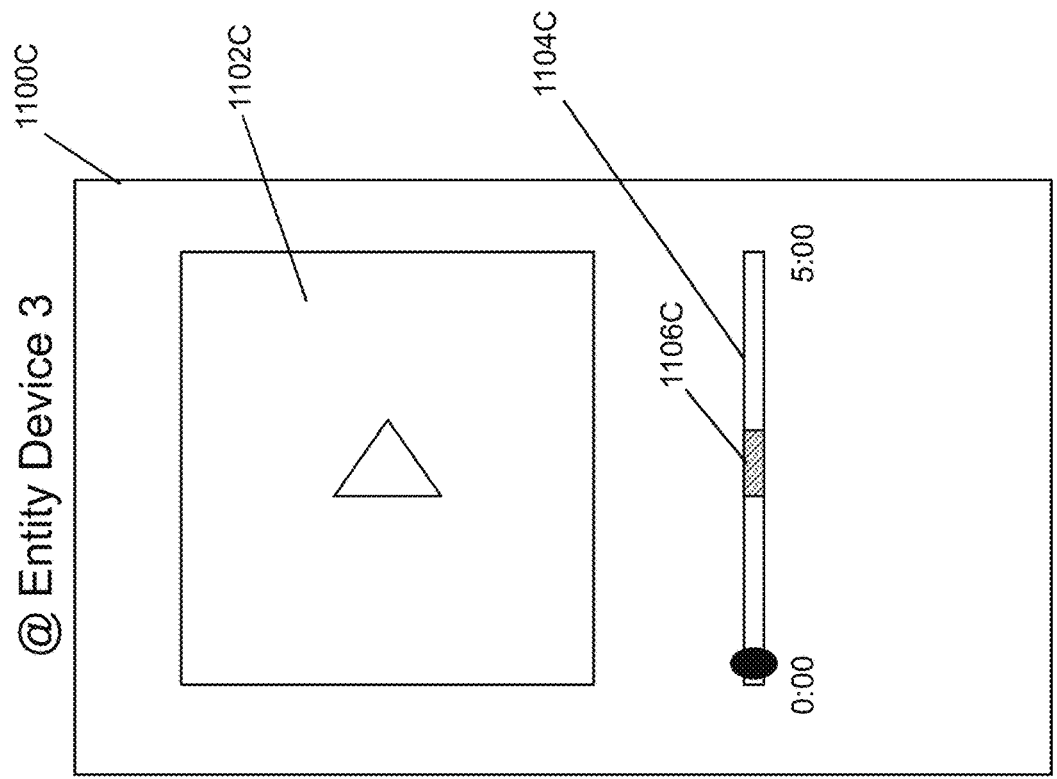
FIG. 25 is an example of a graphical user interface providing the shared multi-media content of FIG. 23, from a perspective of a third entity device.
Figure 24:
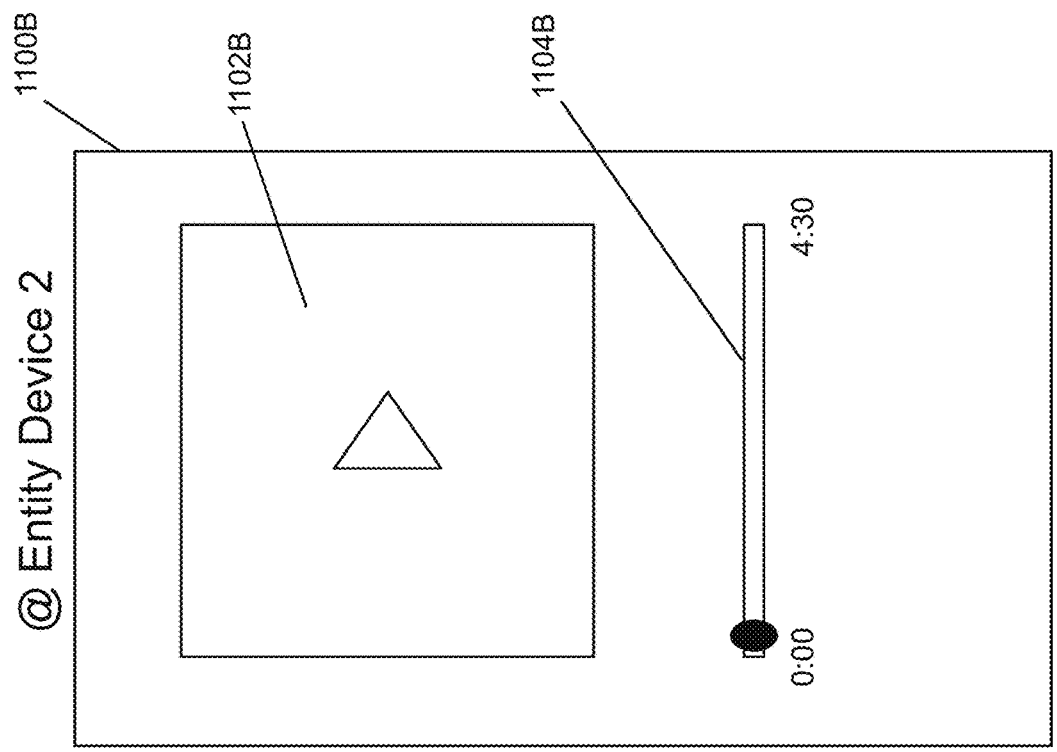
FIG. 24 is an example of a graphical user interface providing the shared multi-media content of FIG. 23, from a perspective of a second entity device.

FIGS. 23 to 25 illustrate another example embodiment for selectively controlling the visibility of electronic content to be displayed by entity devices 23. In this example embodiment, a GUI displaying multi-media content 1100A is to be shared by a first entity device 23 (illustrated as Entity Device 1 in FIG. 23). The multi-media content 1100A includes a video 1102A and a video timeline 1104A specifying a video length of 5 minutes for the sake of illustration. In this example embodiment, Entity Device 1 selects a time window 1106A within the timeline 1104A that corresponds to a 30 second window within the 5 minute video 1102A that is to be modified or concealed for at least one other entity device 23. It can be appreciated that while not shown in the figures, such modification or removal of the content portion associated with the time window 1106A can be applied in various ways. For example, a modification may include obscuring a visual or auditory element (or both), or fast-forwarding through that portion of the video 1102A, to name a few. Removal of the content portion associated with the time window 1106A can also include skipping or forwarding through a track, or completely removing that portion and splicing the balance of the video 1102A.

FIG. 24 illustrates a GUI providing a version of the multi-media content 1100B as displayed by a second entity device 23 (illustrated as Entity Device 2). In this example, Entity Device 2 can view a first modified version of the video 11026 having an associated video timeline 11046 that is shorter in length due to the removal of the portion of the video associated with the time window 1106A by Entity Device 1. FIG. 25 illustrates a GUI providing another version of the multi-media content 1100C as displayed by a third entity device 23 (illustrated as Entity Device 3). In this example, Entity Device 3 can view a second modified version of the video 1102C having an associated video timeline 1104C that is the same length, but includes a modified time window 1106C that corresponds to the time window 1106A selected by Entity Device 1. For example, the video 1102C may be obscured during the time window 1106C to conceal or otherwise modify a portion of the content. It can be appreciated that the visibility control 39 may be used to determine filtering criteria used by Entity Device 1 for sharing with Entity Devices 2 and 3, either automatically or based on user input as illustrated in FIG. 23. Also, while FIGS. 23 to 25 illustrate controlling the visibility of multi-media content having a single owner, the principles equally apply to multiple owners as illustrated in the previous example. It can also be appreciated that, as with the previous examples, the application of the filtering criteria may be applied during an active session that uses the corresponding user interface, or in an offline interaction with the corresponding user interface.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for controlling content displayed in messaging user interfaces, the device comprising:
    a processor;
    a communications module coupled to the processor; and
    a memory coupled to the processor, the memory storing computer executable instructions that when executed by the processor cause the processor to:
        provide a chat interface viewable by a content owner device and at least two recipient devices;
        receive an input from the content owner device to display a message via the chat interface;
        determine at least one criterion for modifying messages input into the chat interface by the content owner device, the at least one criterion controlling message modification based on a recipient type of the at least two recipient devices;
        generate one or more new message portions by modifying a portion of the message of the content owner based on the at least one criterion, wherein the one or more new message portions include at least one new text element compared to the message entered by the content owner device; and
        display at least the one or more new message portions, for the at least two recipient device in the chat interface, each recipient device displaying content that is different.

2. The device of claim 1, wherein the message is created via the chat interface by the content owner device.

3. The device of claim 2, wherein the input from the content owner device selects at least one element of the message to be modified; and
    the computer executable instructions further cause the processor to determine the at least one criterion according to the selected at least one element of the message.

4. The device of claim 1, wherein the device automatically determines the at least one criterion.

5. The device of claim 1, wherein the at least one criterion is determined by the device according to which recipient device of the at least two recipient devices are intended for viewing the message in the chat interface.

6. The device of claim 5, wherein the at least one criterion comprises different modification criteria for different recipient device of the at least two recipient devices.

7. The device of claim 1, wherein at least one element of the message being modified comprises sensitive data associated with the content owner device.

8. The device of claim 7, wherein the sensitive data comprises financial data.

9. The device of claim 1, wherein the device corresponds to the content owner device.

10. The device of claim 1, wherein the message comprises an electronic document shared by the content owner device, and at least one element of the message being modified corresponds to at least a portion of data in the electronic document.

11. The device of claim 1, wherein the message comprises multi-media content shared by the content owner device, and at least one element of the message being modified corresponds to at least a portion of the multi-media content.

12. The device of claim 1, wherein the modifying is applied during an active session of the chat interface.

13. The device of claim 1, wherein the modifying is applied during an offline interaction with the chat interface.

14. The device of claim 1, wherein the message is associated with more than one owner, each owner corresponding to one of a plurality of content owner devices and having a corresponding set of modification criteria, the computer executable instructions further cause the processor to:
    determine the at least one criterion from the corresponding set of modification criteria for another content owner device of the plurality of content owner devices.

15. A method of controlling content displayed in messaging user interfaces, the method executed by a device having a processor and communications module and comprising:
    providing a chat interface viewable by a content owner device and at least two recipient devices;
    receiving an input, from the content owner device, to display a message via the chat interface;
    determining at least one criterion for modifying messages input into the chat interface by the content owner device, the at least one criterion controlling message modification based on a recipient type the recipient device;
    generating one or more new message portions by modifying the message of the content owner based on the at least one criterion, wherein the one or more new message portions include at least one new text element compared to the message entered by the content owner device; and
    displaying at least the one or more new message portions for the at least two recipient devices in the chat interface, each recipient device displaying content that is different.

16. The method of claim 15, wherein the message is created via the chat interface by the content owner device.

17. The method of claim 16, wherein the input from the content owner device selects at least one element of the message to be modified; and
    the at least one criterion is determined according to the selected at least one element of the message.

18. The method of claim 15, wherein the device automatically determines the at least one criterion.

19. The method of claim 15, wherein the message is associated with more than one owner, each owner corresponding to one of a plurality of content owner devices and having a corresponding set of modification criteria, the method further comprising:
    determining the at least one criterion from the corresponding set of modification criteria for another content owner device of the plurality of content owner devices.

20. A non-transitory computer readable medium for controlling content displayed in messaging user interfaces, the computer readable medium comprising computer executable instructions for:
    providing a chat interface viewable by a content owner device and at least two recipient devices;
    receiving an input, from the content owner device, to display a message via the chat interface;

determining at least one criterion for modifying messages input into the chat interface by the content owner device, the at least one criterion controlling message modification based on a recipient type the recipient device;

generating one or more new message portions by modifying the message of the content owner based on the at least one criterion, wherein the one or more new message portions include at least one new text element compared to the message entered by the content owner device; and displaying at least the one or more new message portions for the at least two recipient devices in the chat interface, each recipient device displaying content that is different.

* * * * *